(12) United States Patent
Lu et al.

(10) Patent No.: US 11,989,876 B2
(45) Date of Patent: May 21, 2024

(54) METHOD AND APPARATUS FOR INSPECTING PATTERN COLLAPSE DEFECTS

(71) Applicant: Tokyo Electron Limited, Tokyo (JP)

(72) Inventors: Shin-Yee Lu, Pleasanton, CA (US); Ivan Maleev, Pleasanton, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 18/143,949

(22) Filed: May 5, 2023

(65) Prior Publication Data

US 2023/0274413 A1 Aug. 31, 2023

Related U.S. Application Data

(62) Division of application No. 17/089,158, filed on Nov. 4, 2020, now Pat. No. 11,676,266.

(51) Int. Cl.
*G06T 7/00* (2017.01)
*G06N 3/08* (2023.01)
(Continued)

(52) U.S. Cl.
CPC ............... *G06T 7/001* (2013.01); *G06N 3/08* (2013.01); *G06T 5/20* (2013.01); *G06T 5/40* (2013.01);
(Continued)

(58) Field of Classification Search
CPC .. G06T 7/001; G06T 5/20; G06T 5/40; G06T 2207/20061; G06T 2207/20081; G06T 2207/20084; G06T 2207/30148; G06T 2207/10061; G06N 3/08; G06N 3/048; G06N 3/045; G06N 3/084
See application file for complete search history.

(56) References Cited

U.S. PATENT DOCUMENTS 5,537,669 A * 7/1996 Evans ..................... G06F 18/00
382/280
5,970,168 A 10/1999 Montesanto et al.
(Continued)

FOREIGN PATENT DOCUMENTS

WO WO 0240970 A1 * 5/2002

OTHER PUBLICATIONS

Richard O. Duda, et al., "Use of the Hough Transformation to Detect Lines and Curves in Pictures", COMM. ACM, vol. 15, No. 1, Jan. 1972, pp. 11-15.
(Continued)

*Primary Examiner* — Samir A Ahmed
(74) *Attorney, Agent, or Firm* — Oblon, McClelland, Maier & Neustadt, L.L.P.

(57) ABSTRACT

A method for detecting defects on a sample based on a defect inspection apparatus is provided. In the method, an image data set that includes defect data and non-defect data is organized. A convolutional neural network (CNN) model is defined. The CNN model is trained based on the image data set. The defects on the sample are detected based on inspection data of the defect inspection apparatus and the CNN model. The sample includes uniformly repeating structures, and the inspection data of the defect inspection apparatus is generated by filtering out signals of the uniformly repeating structures of the sample.

10 Claims, 28 Drawing Sheets

(51) Int. Cl.
    *G06T 5/20* (2006.01)
    *G06T 5/40* (2006.01)
(52) U.S. Cl.
    CPC ............... *G06T 2207/20061* (2013.01); *G06T 2207/20081* (2013.01); *G06T 2207/20084* (2013.01); *G06T 2207/30148* (2013.01)

(56) References Cited

U.S. PATENT DOCUMENTS

| | | | |
|---|---|---|---|
| 6,621,568 B1 | 9/2003 | Yonezawa | |
| 6,633,375 B1 | 10/2003 | Veith et al. | |
| 7,106,432 B1* | 9/2006 | Mapoles | G01N 21/9501 356/237.4 |
| 2002/0054291 A1* | 5/2002 | Tsai | G01N 21/95607 356/394 |
| 2005/0259245 A1 | 11/2005 | Cemic et al. | |
| 2007/0081154 A1* | 4/2007 | Mapoles | G01N 21/47 356/237.5 |
| 2017/0177997 A1 | 6/2017 | Karlinsky et al. | |
| 2017/0194126 A1 | 7/2017 | Bhaskar et al. | |
| 2019/0287230 A1 | 9/2019 | Lu et al. | |
| 2022/0067523 A1 | 3/2022 | Karlinsky et al. | |
| 2022/0067898 A1* | 3/2022 | Chen | G06T 3/4007 |

OTHER PUBLICATIONS

Peter E. Hart, "How the Hough Transform Was Invented", IEEE Signal Processing Magazine, vol. 18, Nov. 9, 2009, pp. 18-22.
P. V. C. Hough, "Machine Analysis of Bubble Chamber Pictures", Proceedings of the International Conference on High Energy Accelerators, 1959, pp. 598-602.
Jeppe Jensen, "Hough Transform for Straight Lines", Mini-Project in Image Processing, SCRIBD, 7th Semester, 2007, 4 pages.

* cited by examiner

1102

1104

2102

2104

2106

2402

2404

2406

2502

2504

2506

METHOD AND APPARATUS FOR INSPECTING PATTERN COLLAPSE DEFECTS

CROSS REFERENCE TO RELATED APPLICATIONS

This application is related to U.S. patent application Ser. No. 17/088,885, entitled "Optical Sensor for Inspecting Pattern Collapse Defects", filed on Nov. 4, 2020, and U.S. patent application Ser. No. 17/089,158, entitled "Method and Apparatus for Inspecting Pattern Collapse Defects", Published as Pub. No. US 2022/0138921 A1 with an effective filing date of Nov. 4, 2020, the entire contents of which are incorporated herein by reference.

BACKGROUND

The present disclosure relates to an optical sensor and methods for inspecting semiconductor structures for pattern collapse defects, and, more particularly, to methods, systems, and apparatuses for inspecting a semiconductor sample with a uniformly repeating structure to detect defects including deviations from uniform periodicity of the uniformly repeating structure.

Semiconductor wafer cleaning solutions are a critical part of the industry. The purpose of cleaning could be to remove residual by-products after other semiconductor process steps, such as etching or polishing. One may also desire to remove surface particles or unwanted films. A typical cleaning process can use one or multiple solvents such as SC1/SC2 liquids and an alcohol, such as isopropyl alcohol (isopropanol, IPA). At the end of the cleaning process it is also critical to remove from the wafer surface any traces of the cleaning solution itself. Established methods may use the agents that reduce surface tension and ability of cleaning solutions to "wet" the surface. Ideally one would like an agent with the surface tension approaching zero and the capability to turn into a gas without going through a phase transition. An example of the latter is supercritical carbon dioxide (scCO2).

In an exemplary embodiment of using the scCO2 to remove the traces of the cleaning solution, a wafer can be placed in a chamber where normally gaseous $CO_2$ turns into supercritical fluid state ($scCO_2$) at high pressure and temperature. $scCO_2$ can dissolve and displace a cleaning agent (e.g., isopropanol (IPA)) so that the cleaning agent can be removed via an exhaust port. At the end of the cleaning cycle only pure scCO2 remains. Then the pressure and the temperature in the chamber can be gradually reduced. Once below a supercritical point, $CO_2$ can turn into gas and leave the wafer dry and theoretically free from cleaning byproducts. However in practice a cleaning tool itself may introduce additional surface pattern defects and particles. Thus, a rapid after-cleaning inspection capability is desired. A post-wafer drying inspection step is desirable also in processes that involve more conventional drying methods, such as wafer spinning, allowing solvent to evaporate naturally or by forced convection, etc., all of which also may introduce surface pattern defects caused by capillary forces present during the drying step.

Traditional inspection methods can include a top-down CD-SEM inspection and a full-wafer optical inspection. However the CD-SEM inspection relies on direct imaging and has a limited field-of-view (FOV). For example, assuming 1000×1000 pixel FOV and 5 nm pixel size, the CD-SEM inspection can provide an image of only 5×5 um area. Scanning an area, such as a 1×1 mm area, can require 4E+10 pixels. Thus, the time and cost of inspecting a meaningful portion of a wafer quickly becomes prohibitive. On the opposite end of spectrum is the full-wafer optical inspection that can rapidly scan a wafer and rely on sensitivity techniques. However the cost of such universal systems is prohibitively high. There is an unmet need for a low-cost rapid review station that can detect after-cleaning defects in line with a cleaning tool operation.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

A cleaning tool may generate surface particles due to impurities in cleaning agents and particulates in a cleaning chamber. Damage may include toppling defects on tops of pattern structures. However one key problem for the cleaning tool developers is the possibility of pattern collapse events due to surface tension forces of the cleaning agents. For example, in a two-dimensional structure neighboring pillars may stick together. Furthermore, initial collapse may trigger a chain of pattern collapse events. Multiple factors might be responsible. The factors may include incorrectly set up cleaning process, chamber design issues, and poor quality cleaning chemicals. In order to identify collapse events and control cleaning chamber operation, a feedback in the form of a low cost non-destructive review station is highly desired. The first goal for such station is to catch the event of catastrophic damage to a wafer. The second goal is to count individual defects and generate statistical data.

In the disclosure, embodiments are directed methods and apparatus (or review stations, or systems) for performing optical review of wafers after the wafers are processed on a cleaning tool. The apparatus are tailored for optical detection of pattern collapse events, but are also capable of detecting particles on a top surface of a patterned wafer, as well as other wafer defects. The methods are sensitivity based, where the signal from the periodic pattern can be minimized, so that the signal from the defects can be detectable. It is understood that the defects size is generally less than the Rayleigh limit of optical resolution.

There are two closely related types of defects that the review stations are designed to catch: individual "seed" pattern collapse events, and "chain" defects. In an example of a two-dimensional periodic structure of pillars, a "chain" defect starts with a seed defect, followed by collapse of a neighboring pillar, and then next one, and so on, eventually forming a zip line-like chain with two or more links. A key idea of the disclosure is that the effective pitch of a periodic structure with defects can alter from an original value. For example, if N structure pillars collapse in pairs and form a new structure of N/2 dual-pillars, the pitch of the new structure can increase by two times. Angular and amplitude distribution of diffractive orders can change correspondingly. Therefore, a system (or a review station) that completely cancels out signal from an original structure, can register distorted signal from a structure with defects. The essence of the disclosure is that the review station can automatically minimize background signal from the original structure while maximize signal originating from described "chain" defects.

In an aspect of the disclosure, a method for detecting defects on a sample based on a defect inspection apparatus is provided. In the method, an image data set that includes defect data and non-defect data can be organized. A convolutional neural network (CNN) model can further be defined. The CNN model can be trained based on the image data set. The defects on the sample can be detected based on inspection data of the defect inspection apparatus. The sample can include uniformly repeating structures, and the inspection data of the defect inspection apparatus can be generated by filtering out signals of the uniformly repeating structures of the sample.

In order to organize the image data set, a first portion of the image data set can be defined for training the CNN model, and a second portion of the image data set can be defined for validating the CNN model.

In the method, the CNN model can further be validated based on the second portion of the image data set.

In order to define the CNN model, convolution layers of the CNN model can be defined. In addition, filter sizes for the convolution layers of the CNN model can be defined, where each of the convolution layers can have a respective filter size. Further a dilation option of the CNN model can be defined.

In some embodiments, in order to train the CNN model based on the image data set, a learning rate can be defined when the CNN model is trained, and the CNN model can be trained subsequently based on the first portion of the image data set.

In some embodiments, the inspection data is generated by filtering out the signals of the uniformly repeating structures of the sample through a spatial light modulator (SLM) of the defect inspection apparatus.

In some embodiments, the SLM can include wires and fork structures. In the SLM, each of the wires can be mounted on a respective fork structure of the fork structures. In addition, each of the fork structures can be positioned in a different plane along a detection light beam of the defect inspection apparatus. Further, each of the fork structures can be adjustable with a manual or motorized micrometer, and the wires can be positioned in a same plane that is perpendicular to the detection light beam of the defect inspection apparatus.

In the method, the image data set that includes the defect data and the non-defect data can be generated from test samples, where the test samples can include uniformly repeating structures, and signals of the uniformly repeating structures of the test samples can be filtered out from the defect data and the non-defect data through the SLM of the defect inspection apparatus.

In order to detect the defects on the sample based on the inspection data of the defect inspection apparatus, the inspection data can be generated through the defect inspection apparatus. The inspection data can include first inspection data captured by a sensor of the defect inspection apparatus. The first inspection data can be captured by scanning a region of the sample that is equal to a field of view (FOV) of the defect inspection apparatus, where the region of the sample can have one dimension of at least 100 um, and the first inspection data can include a plurality of images that are joined together.

In the method, each of the images can be generated under a different one of a respective illumination wavelength, a respective illumination mode, or a respective polarization through a light source of the defect inspection apparatus.

According to another aspect of the disclosure, a method for detecting defects on a sample based on a defect inspection apparatus is provided. In the method, an inspection image can be captured through the defect inspection apparatus. An enhancement process can be performed on the inspection image to improve a contrast of the inspection image and remove noisy features of the inspection image. A Hough transform can further be performed on the inspection image that receives the enhancement process so as to identify defects on the sample. The sample can include uniformly repeating structures, and the inspection image can be captured by filtering out signals of the uniformly repeating structures of the sample.

In the method, in order to capture the inspection image through the defect inspection apparatus, a plurality of images can be captured from the sample, where each of the images can be captured from a respective region of the sample. The respective region of the sample can have one dimension of at least 100 um. In addition, each of the images can be generated by filtering out signals of the uniformly repeating structures of the sample through a spatial light modulator (SLM) of the defect inspection apparatus. Further, each of the images can include a plurality of sub images that are grouped together.

Further, each of the sub images can be generated under a different one of a respective illumination wavelength, a respective illumination mode, or a respective polarization through a light source of the defect inspection apparatus.

In some embodiments, the SLM can include wires and fork structures. Each of the wires can be mounted on a respective fork structure of the fork structures. Each of the fork structures can be positioned in a different plane along a detection light beam of the defect inspection apparatus. Each of the fork structures is adjustable with a manual or motorized micrometer, and the wires are positioned in a same plane that is perpendicular to the detection light beam of the defect inspection apparatus.

In some embodiments, in order to perform the enhancement process on the inspection image, the images can be jointed to form the inspection image.

In some embodiments, in order to perform the enhancement process on the inspection image, a signal filtering process can be performed on the inspection image to filter out big features that have size more than 1.3 um based on a signal processing filter. In some embodiments, the signal processing filter can be a range filter.

In order to perform the enhancement process on the inspection image, a histogram equalization process can further be performed on the inspection image that receives the signal processing filter so as to enhance an image contrast of the inspection image.

In order to perform the enhancement process on the inspection image, an image flat field correction can be performed on the inspection image that receives the histogram equalization process.

In order to perform the enhancement process on the inspection image, a binary enhancement process can be performed on the inspection image that receives the image flat field correction so as to remove small features that have a size less than 4 $um^2$.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
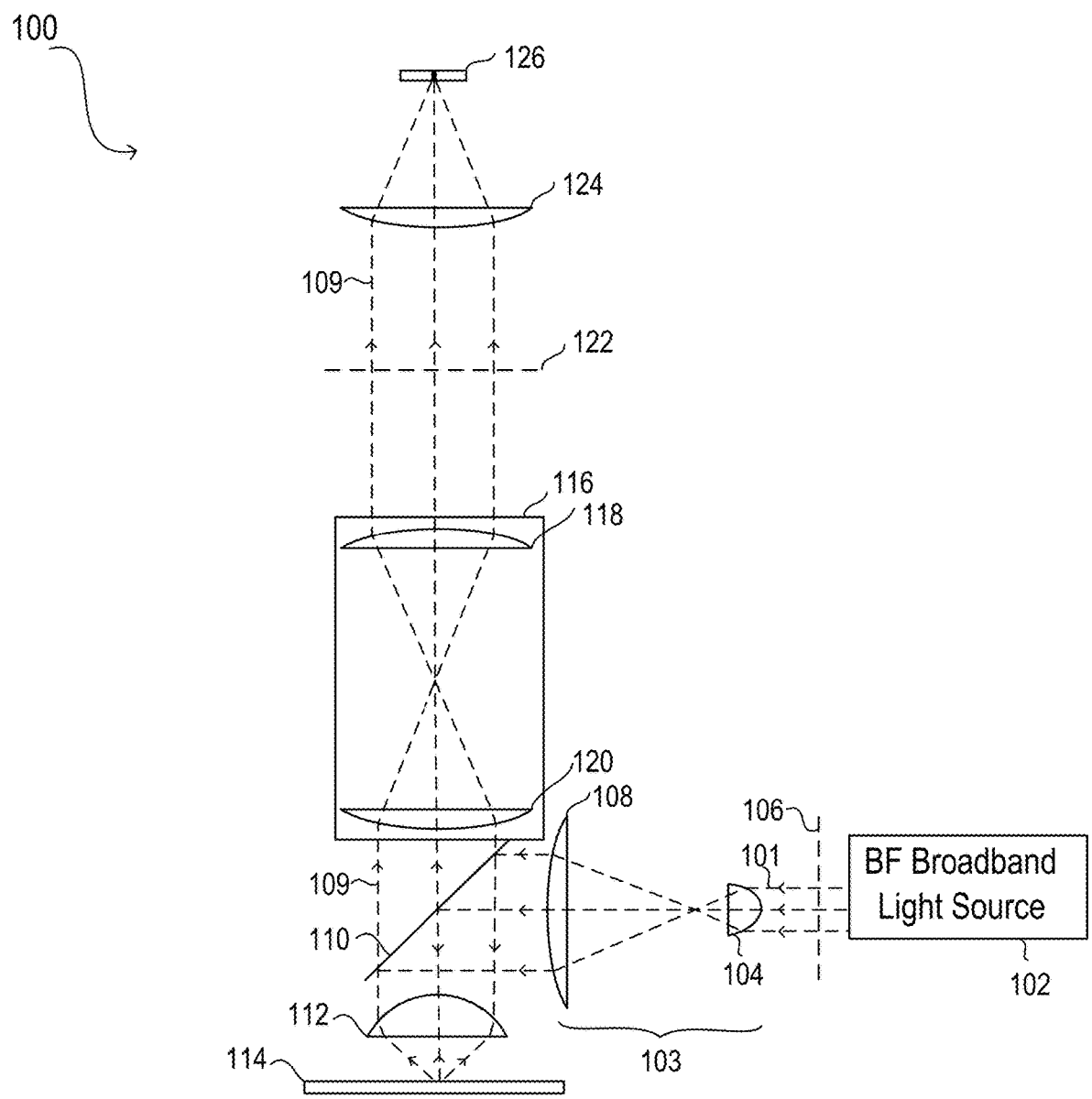
FIG. 1 is a schematic diagram of a first exemplary defect inspection apparatus in accordance with some embodiments.

Referring now to the drawings, wherein like reference numerals designate identical or corresponding parts throughout several views, the following description relates to a system and associated methodology for real-time in-situ film properties monitoring of a plasma process of patterned or un-patterned wafer in semiconductor manufacturing.

Reference throughout the specification to "one embodiment" or "an embodiment" means that a particular feature, structure, material, or characteristic described in connection with the embodiment is included in at least one embodiment, but do not denote that they are present in every embodiment. Thus, the appearances of the phrases "in one embodiment" in various places through the specification are not necessarily referring to the same embodiment. Furthermore, the particular features, structures, materials, or characteristics may be combined in any suitable manner in one or more embodiments.

In the disclosure, a system (or review station) is provided. The system can be a process-integrated optical review microscope with a tunable illumination light source or a tunable wavelength filter, and programmable pupil plane filtering of signals from periodic gratings. The disclosed system can collect separate digital images of a sample at multiple wavelengths of interest, and reconstruct spectroscopic information for each pixel.

Distinguishing features of the system (or review station) can include: (1) integration within a cleaning tool sequence of operations and ability to provide real-time feedback to the cleaning chamber; (2) wafer handling stage with precise focusing capability (e.g., <0.5 um) and ability to support point-by-point metrology measurements; (3) optical review microscope with sub-micrometer optical resolution and multi-wavelength illumination channels. The wavelengths of the system can be changed sequentially, allowing the optical review microscope to produce sequence of images, and create a rudimentary spectrum for each pixel; (4) the optical review microscope can use one or both of direct reflection (e.g., "bright field") and scattering (e.g., "dark field") measurement modes. Combination of direct reflection and the multi-wavelength illumination effectively offers the capability of a spectroscopic reflectometer with sub-micron pixel size in each pixel; (5) optical Fourier plane spatial light modulator/filter, placed in the pupil plane of the optical review microscope, and designed to cancel out signal from periodic structures or specified pitch.

A key advantage of the disclosed system, compared to a traditional spectroscopic solution, is the ability to extract spectroscopic information specific to a multitude of sub-micron sized areas, which allows the system to detect certain types of defects that normally cannot be detected by either microscopy or spectroscopic ellipsometry/reflectometry approaches.

The optical resolution, spatial distribution of optical rays, polarization, and wavelength/spectral properties are the key factors that affect sensitivity of an optical system. Typical microscopes provide high-resolution images of an object at one or few illumination wavelengths (WL). At the opposite end of capabilities are non-imaging spectroscopic scatterometers. Neither can provide detailed spectroscopic information about sub-micron area of interest on a wafer surface.

The process of formation of pattern collapse defects on two-dimensional shallow trench isolation (STI)-like structures may result in a zip line-like one-dimensional chain of links between individual pattern "pins". Formation of a "zip" line implies an effective local change in pitch of a periodic structure. Spectroscopic measurements of diffraction gratings are extremely sensitive to the change in pitch. In fact, spectroscopic ellipsometry (SE) and reflectometry (SR) are preferred techniques for measuring properties of gratings (CD). However, locality of a pattern collapse defect implies that traditional large-spot SE/SR might have limited sensitivity due to the area with defects still being very small compared to spot size In the disclosure, the large-spot SE/SR can be replaced with an imaging system (or a system, a review station), capable of performing spectroscopic analysis on a sub-micron-size pixel. Such a system can be built based on a regular microscope by adding a tunable light source, and named as a spectroscopic microscope.

In the disclosure, an optical architecture of the system can be formed based on an imaging microscope with an optical resolution below one um level and with a multi-pixel linear or area digital sensor. Assuming a sufficiently high numerical aperture (NA) and high quality of components, the optical architecture can provide optical resolution performance intrinsically superior to any spot-scanning or otherwise non-imaging optical systems at a same wavelength. In the disclosure, a key feature includes an illumination subsystem that is based around a tunable light source, where the tunable light source can rapidly scan in time over a set of wavelengths of interest and provide spectroscopic information for each sub-micron pixel. Alternatively, tunable wavelength filter may be placed in an intermediate pupil plane of a collection subsystem of the system.

FIG. 1 is schematic diagram of a first exemplary defect inspection apparatus (or a spectroscopic microscope, or a review station, or a system) 100 that provides bright filed illumination. As shown in FIG. 1, the spectroscopic microscope 100 can include a light source 102 with selectable illumination wavelength(s) in DUV-UV-VIS-IR range. The light source 102 can be either coherent or incoherent. The Light source 102 can be fiber-coupled or directly-coupled to either a bright field or a dark field illumination subsystem. In an exemplary embodiment of FIG. 1, the light source 102 is configured to provide bright field illumination. An incident light beam 101 can be generated by the light source 102 and directed to illumination pupil relay optics 103 that include a first lens 104 and a second lens 108. In some embodiments, the first lens 104 and the second lens 108 can be convex lenses. The illumination pupil relay optics 103 can be disposed within the incident light beam 101 and configured to form an illumination pupil plane 106 in cooperation with the light source 102. The incident light beam 101 can further be directed to a beam splitter 110 that is configured to direct the incident light beam 101 at a substantially vertical angle of incidence upon a sample 114 that is positioned over a stage (not shown). The incident light beam 101 can be reflected or scattered from the sample 114, and further be collected by imaging optics 112 for forming a detection light beam 109. The imaging optics 112 can be arranged over the sample 114 and positioned between the sample 114 and the beam splitter 110.

Still referring to FIG. 1, the detection light beam 109 can be directed to detection pupil relay optics 116. The detection pupil relay optics 116 can be disposed within the detection light beam 109 include a third lens 118 and a fourth lens 120. The detection pupil relay optics 116 can further direct the detection light beam 109 toward collection optics 124. The detection pupil relay optics 116 can be configured to form a detection pupil plane 122 in cooperation with the collection optics 124. The collection optics 124 can be disposed within the detection light beam 109, and configured to direct the detection light beam 109 to a detector (or sensor) 126. The detector 126 is configured to receive the detection light beam 109 and acquire images of the sample 114. In some embodiments, the sensor 126 can be a multi-pixel (e.g., line, or time delay integration, or area) sensor. The sensor 126 can also be a single-pixel sensor, such as a photomultiplier tuber (PMT), a photodiode, or a photo detector. The sample 114 can be a semiconductor sample that includes a uniformly repeating structure and defects, where the defects include deviations from uniform periodicity of the uniformly repeating structure.

In some embodiments, a first light modulator (not shown) can be substantially positioned in the detection pupil plane 122. The first light modulator is configured to filter out signals from the detection light beam 109, where the signals originate from the uniform periodicity of the uniformly repeating structures on the sample 114. In some embodiments, the first light modulator can include at least one of a monochromator, a polarizer, a filter, a mask, a spatial light modulator (SLM) including a mechanical SLM with multiple adjustable wires, a multi-pixel liquid crystal panel with controlled transmission, a MEMS structure with controlled transmission, or a controlled acousto-optical deflection structure. The first light modulator can maximize a signal-to-noise ratio, where optical photons originating from a periodic structure of specified dimensions & pitch can be considered to be noise, and optical photons originating from defects can be considered signal proper.

In some embodiments, a second light modulator (not shown) can be located substantially in the illumination pupil plane 106, wherein the second light modulator can include at least one of a monochromator, a polarizer, a filter, or a mask.

In some embodiments, the spectroscopic microscope 100 can be configured for imaging a region of the sample 114, where the region can have one dimension of at least 100 μm.

Figure 2:
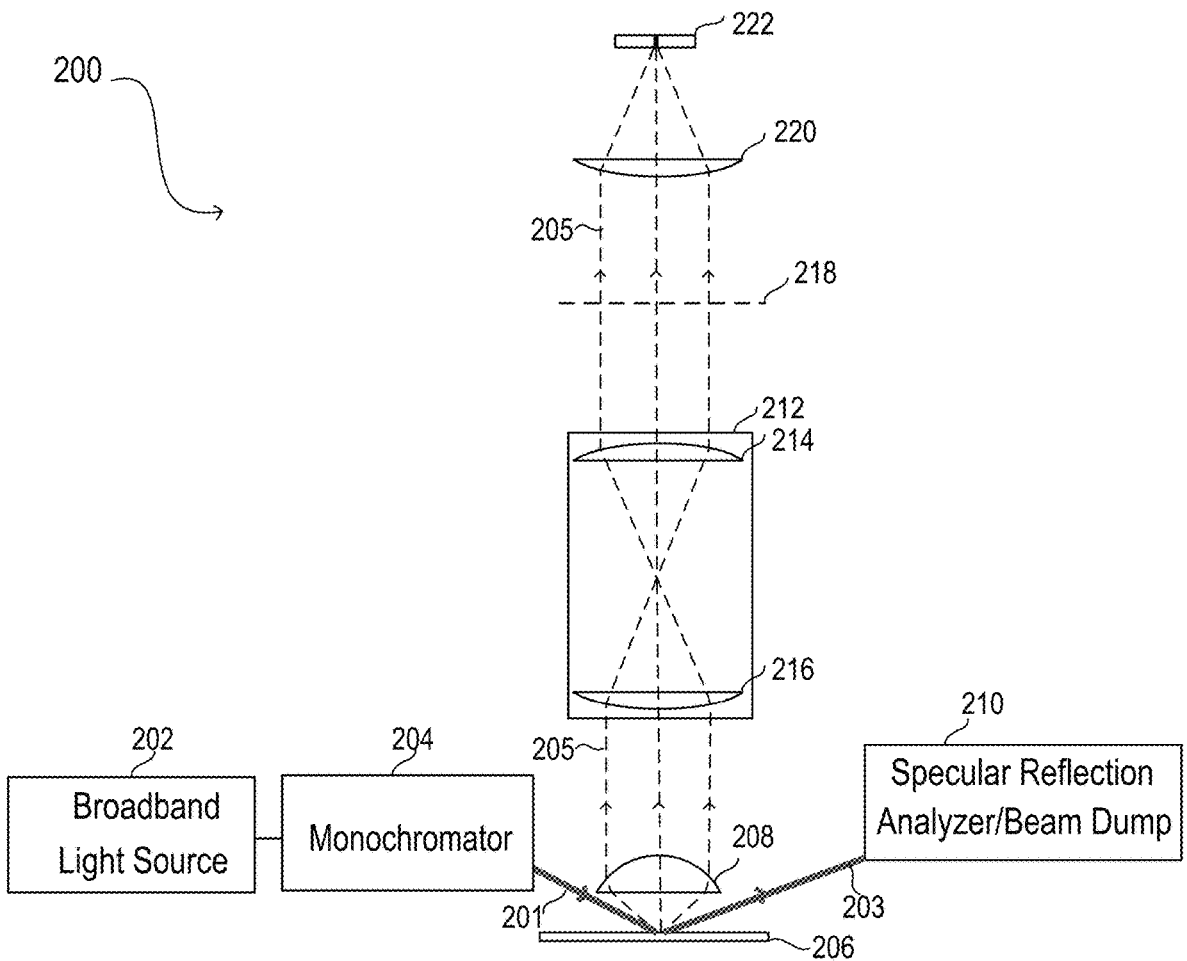
FIG. 2 is a schematic diagram of a second exemplary defect inspection apparatus in accordance with some embodiments.

FIG. 2 is a schematic diagram of a second exemplary defect inspection apparatus (or spectroscopic microscope, or a system, or a review station) 200 that provides dark field illumination. As shown in FIG. 2, the spectroscopic microscope 200 can have a light source 202 that can be fiber-coupled or directly-coupled to a dark field illumination subsystem. The light source 202 can be further coupled to a monochromator 204 that is positioned between the light source 202 and a sample 206, and configured to adjust wavelengths of an incident light beam 201 generated by the light source 202. The incident light beam 201 can be directed to the sample 206 at an incidence angle of between 0 degree and 90 degrees. The incident light beam 201 can be reflected or scattered from the sample 206 and further be collected by imaging optics 208 for forming a detection light beam 205. The imaging optics 208 can be arranged over the sample 206 and positioned between the sample 206 and detection pupil relay optics 212. In some embodiments, the spectroscopic microscope 200 can further include a specular reflection analyzer 210 for detecting specularly reflected light 203 from the sample 206. In some embodiments, the specular reflection analyzer 210 can be a single-pixel or a multi-pixel (e.g., line, or time delay integration, or area) sensor.

The detection light beam 205 can be directed to the detection pupil relay optics 212 by the imaging optics 208. The detection pupil relay optics 212 can be disposed within the detection light beam 205 and include a first lens 214 and a second lens 216. It should be noted that FIG. 2 is just an exemplary embodiment, and the detection pupil relay optics 212 can include any number of lenses according to designs. The detection pupil relay optics 212 can be configured to form a detection pupil plane 218 in cooperation with collection optics 220. The collection optics 220 can be disposed within the detection light beam 205, and configured to direct the detection light beam 205 to a detector 222. The detector 222 is configured to receive the detection light beam 205 and acquire images of the sample 206.

In some embodiments, the first light modulator (not shown) can be substantially positioned in the detection pupil plane 218 to filter out signals from the detection light beam 205, where the signals originate from the uniform periodicity of the uniformly repeating structures on the sample 206.

In some embodiments, the spectroscopic microscope 200 can further include a second light source configured to generate a second incident light beam to illuminate the sample 206 on the stage. A beam splitter (e.g., 110) can be disposed within the detection light beam 205 and configured to direct the second incident light beam at a substantially vertical angle of incidence upon the sample 206. Thus, a dual illumination mode that includes both the dark filed illumination and the bright filed illumination can be introduced in the spectroscopic microscope 200.

Figure 3A:
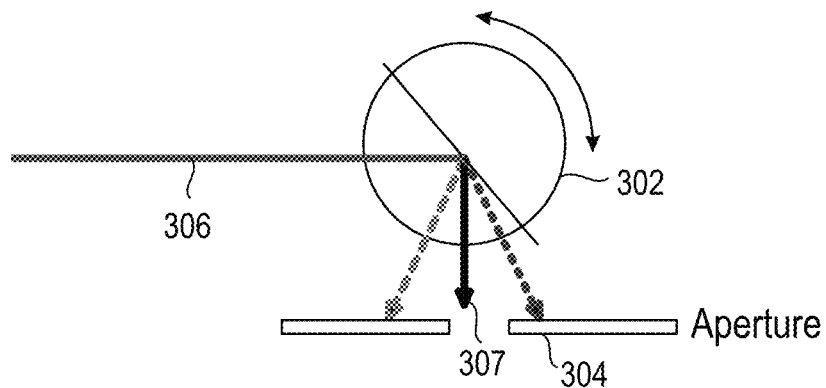
FIG. 3A is a schematic view of a first exemplary monochromator/wavelength filter in accordance with some embodiments.
Figure 3B:
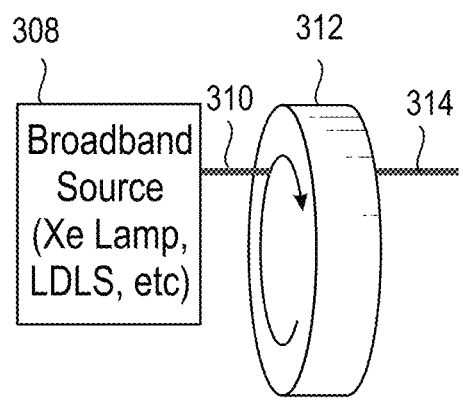
FIG. 3B is a schematic view of a second exemplary monochromator/wavelength filter in accordance with some embodiments.
Figure 3C:
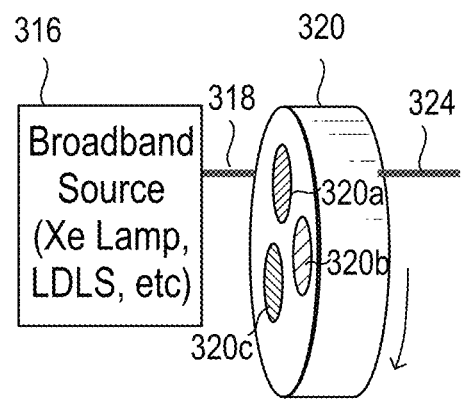
FIG. 3C is a schematic view of a third exemplary monochromator/wavelength filter in accordance with some embodiments.

In the disclosure, the light source (e.g., 102 or 202) can apply an acousto-optical filter, a mechanical scanning with rotating diffraction grating or wavelength filters, or other methods to rapidly scan in time over wavelengths of interest. FIGS. 3A-3E illustrate various exemplary monochromators/wavelength filters that can be combined with the light source. For example, FIG. 3A shows a rotating stage 302 with diffraction grating that is coupled to an incident light beam 306. The incident light beam 306 can be filtered by the rotating stage 302 to generate illumination light beam 307 with wavelengths of interest. The illumination light beam 307 can further be directed through an aperture 304. FIG. 3B shows a rotating spectral filter 312 with variable spectral transmission that is coupled to an incident light beam 310 generated by a light source 308. The incident light beam 310 can be filtered by rotating spectral filter 312 to generate an illumination light beam 314 with different wavelengths in wavelength sweeps during an operation of the spectroscopic microscope 100 or 200. FIG. 3C shows a rotating spectral filter 320 with discrete number of small wavelength-specific filters 320a-320c. The rotating spectral filter 320 can be coupled to an incident light beam 318 generated by a light source 316 and generate an illumination light beam 324 with wavelengths of interest.

Figure 3D:
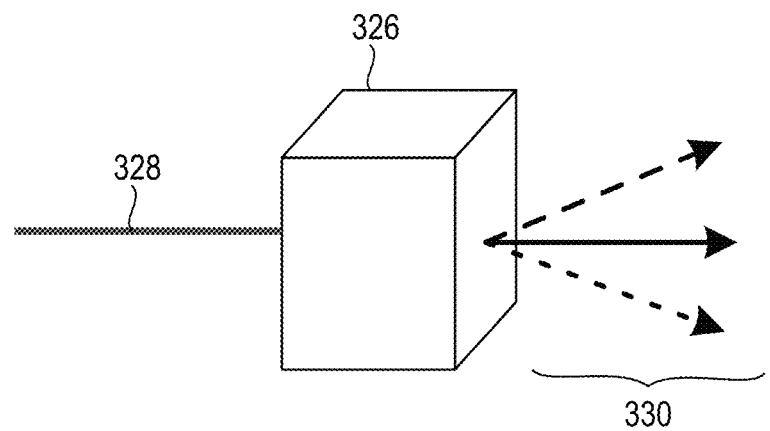
FIG. 3D is a schematic view of a fourth exemplary monochromator/wavelength filter in accordance with some embodiments.
Figure 3E:
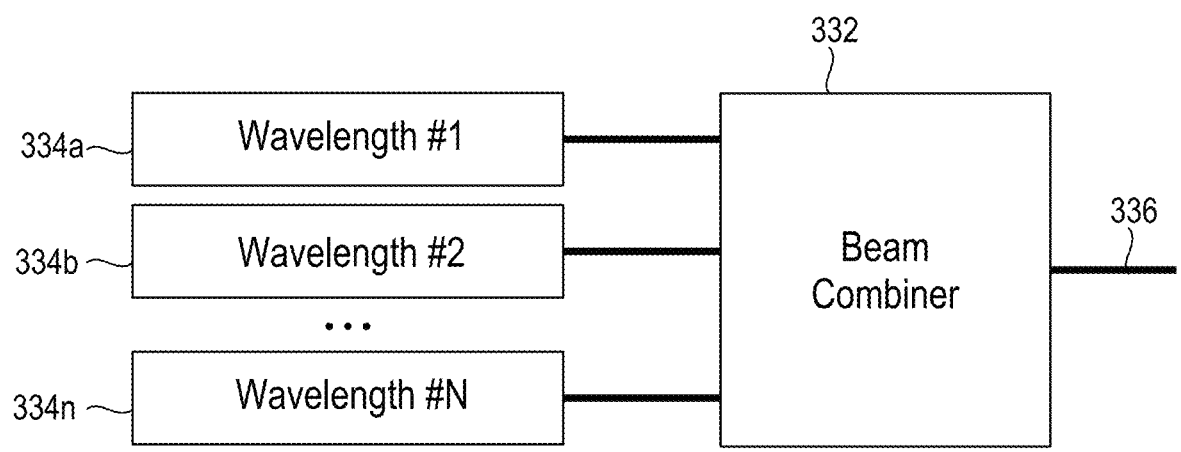
FIG. 3E is a schematic view of a fifth exemplary monochromator/wavelength filter in accordance with some embodiments.

FIG. 3D shows an acousto-optical modulator 326 that can include a piezoelectric transducer which creates sound waves in a material like glass or quartz. An incident light beam 328 can be coupled to the acousto-optical modulator 326 and diffracted into an illumination beam 330 with several diffraction orders. FIG. 3E is a multi-source beam combiner 332 that can combine a plurality incident light beams 334a-334n with different wavelengths into an illumination light beam 336.

Figure 4A:
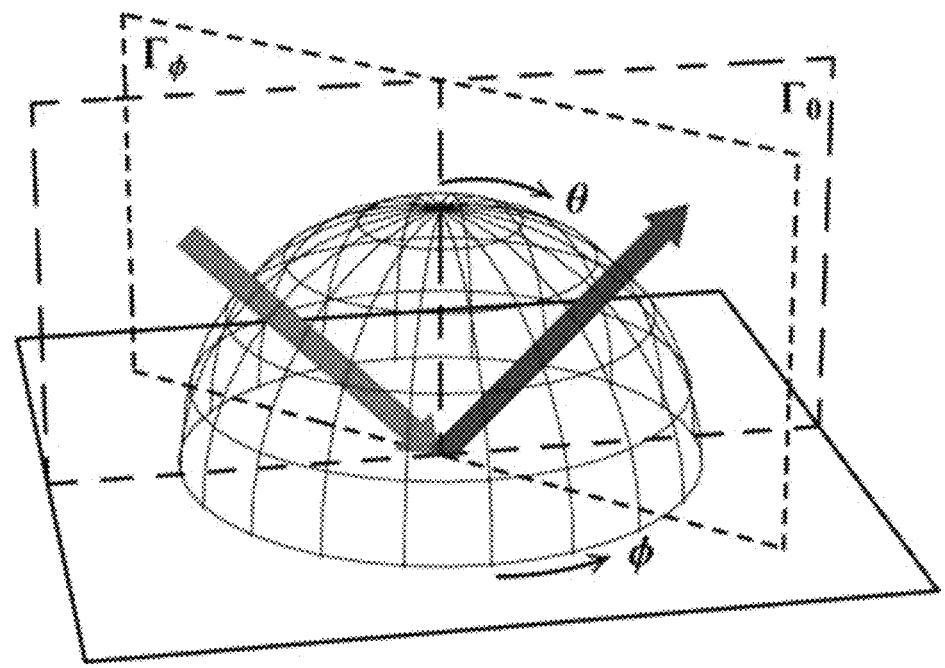
FIG. 4A is a schematic diagram of an exemplary scattering hemisphere in accordance with some embodiments.
Figure 4B:
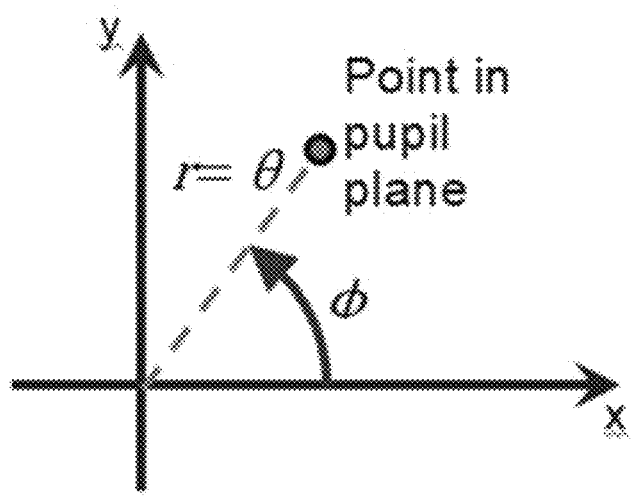
FIG. 4B is a schematic diagram of an exemplary pupil plane in accordance with some embodiments.

In the disclosure, optical collection subsystem of the system (e.g., 100 or 200) collects rays (or light) that are either reflected or scattered by a sample over a range of spatial/body angles. For a non-transparent surface, reflected/scattered rays are distributed over a scattering hemisphere, and are identified by two angles: azimuth (or Az, angle between ray projection into sample plane and in-plane coordinate axis) and AoS (or angle-of-scatter, angle between ray and coordinate axis, normal to the plane), that can be shown in FIGS. 4A and 4B. FIG. 4A shows a scattering hemisphere, where $\Gamma_0$ is a incidence plane, $\theta$ denotes angle-of-scattering (AoS), $\Gamma_\phi$ is a scattering plane, and $\phi$ is the azimuth (Az). FIG. 4B shows a pupil plane, where coordinates $(r, \phi)$ in the pupil plane correspond to (AoS, Az).

Still referring to FIG. 4B, optical collection path may include an intermediate pupil plane. In the pupil plane Az and AoS angular coordinates can turn into spatial XY coordinate system, which can also be represented by polar coordinate system r (or AoS) and $\phi$ (or Az). In the pupil plane a subsystem can be placed to control polarization of light (Pol) that reaches a sensor (e.g., 222). Also, the pupil plane may contain a mask of variable attenuation so that rays at undesired AoS & Az are either attenuated or blocked. For a bright field system, processing of light in the collection path pupil plane may be replaced with similar processing in an illumination path. In that case, AoS would be called AOI (angle-of-incidence).

In the form of equation, light attenuation in the pupil plane (not including polarization alterations) can be described by equation (1):

$$E_{out}(AoS,Az,WL,Pol)=T(AoS,Az,WL(t),Pol)*E_{in}(AoS, Az,WL,Pol) \quad \text{Eq. (1)}$$

Where Ein and Eout are respectively input and output electric fields, and wavelength WL is a function of time. The approach mentioned above is different from hyperspectral cameras that sacrifice optical resolution for enhanced spectral sensitivity, and is also different from microscopes that provide "color" images with limited (typically <4) different wavelengths.

Figure 5A:
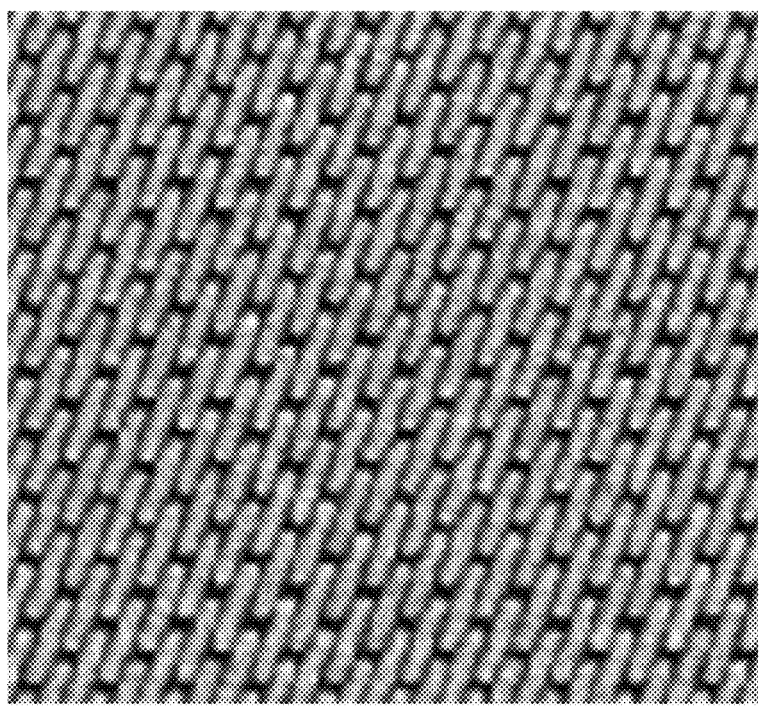
FIG. 5A is a first image of a periodic structure obtained by CD-SEM from a semiconductor sample in accordance with some embodiments.
Figure 5B:
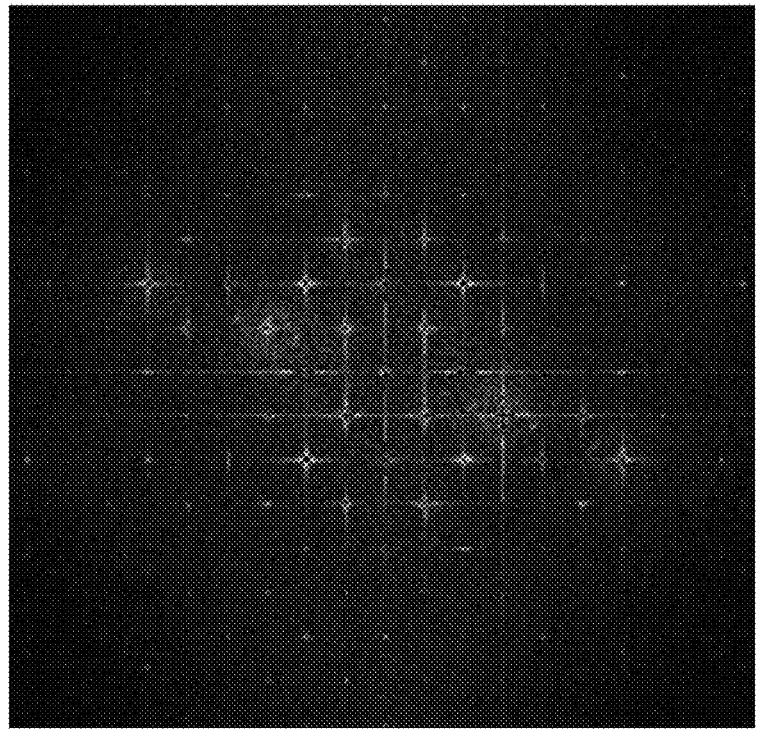
FIG. 5B is a first pupil plane distribution after filtering out the periodic structure in accordance with some embodiments.
Figure 6A:
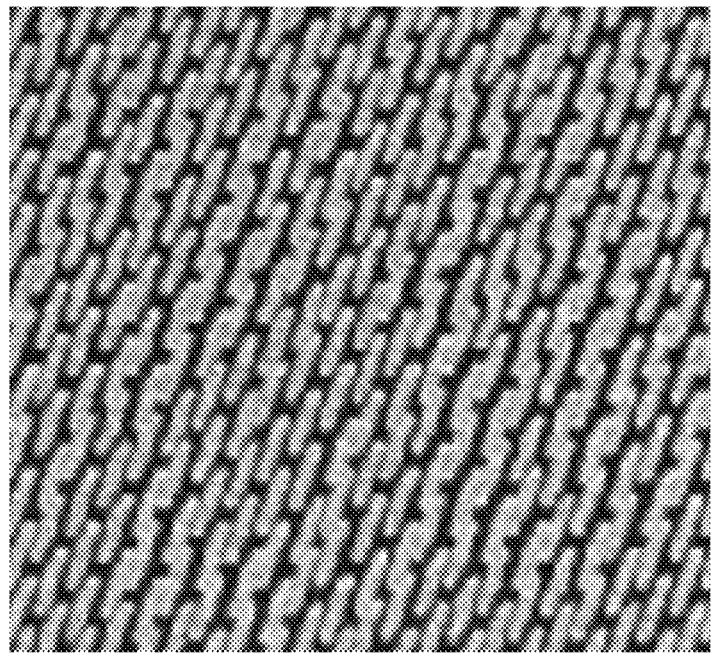
FIG. 6A is a second image of a periodic structure with multiple defects obtained by CD-SEM from a semiconductor sample in accordance with some embodiments.
Figure 6B:
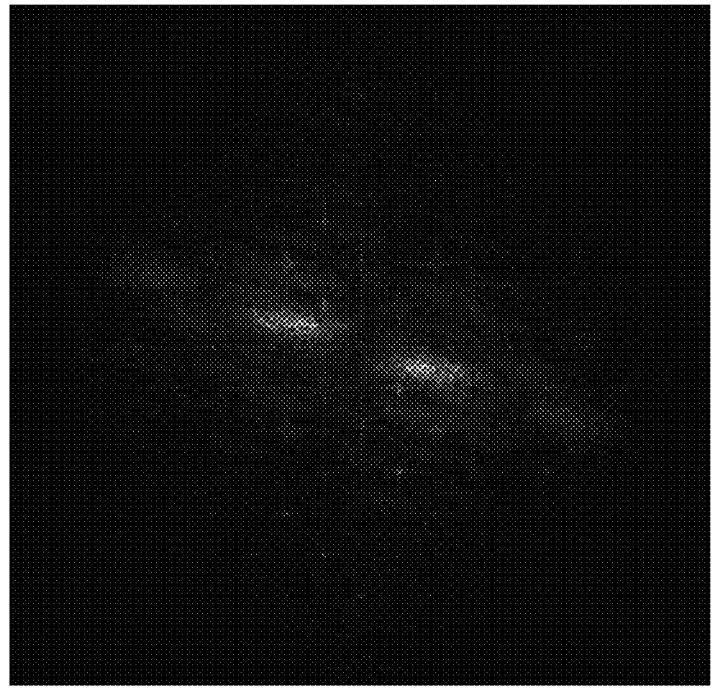
FIG. 6B is a second pupil plane distribution after filtering out the periodic structure in accordance with some embodiments.

In an exemplary embodiment, the review station (e.g., 100 or 200) can have a programmable transmission or reflection-based pupil plane modulator/spatially resolving attenuation filter that can be positioned at the pupil plane (e.g., 122 or 218). The primary purpose of such spatial light modulator (SLM) is to filter out periodic structure signal based on a pre-calculated or pre-measured distribution of the periodic structure signal in the pupil plane, and transmit distribution from the defects in the sample. FIG. 5A is a first image of a periodic structure obtained by CD-SEM from a sample (or a semiconductor sample), where the periodic structure has no defects. FIG. 5B is a first corresponding pupil plane distribution after filtering out the periodic structure of the sample. FIG. 6A is a second image of a periodic structure with multiple defects obtained by CD-SEM from a semiconductor sample. FIG. 6B is a second corresponding pupil plane distribution after filtering out the periodic structure in the sample. As shown in FIG. 6B, signals from the multiple defects can be caught by filtering out signals from the periodic structure in the sample.

Various methods can be applied to form the actual spatial light modulation (SLM). For example, the SLM can made of (a) a mechanical system that includes multiple adjustable wires, (b) a multi-pixel liquid crystal panel with control over transmission/polarization of individual pixels (LC-SLM), (c) a MEMS structure of individually controlled transmission blocking "flaps", wires, or deformable mirrors, and (d) a controlled acousto-optical deflection (AOD).

Figure 7A:
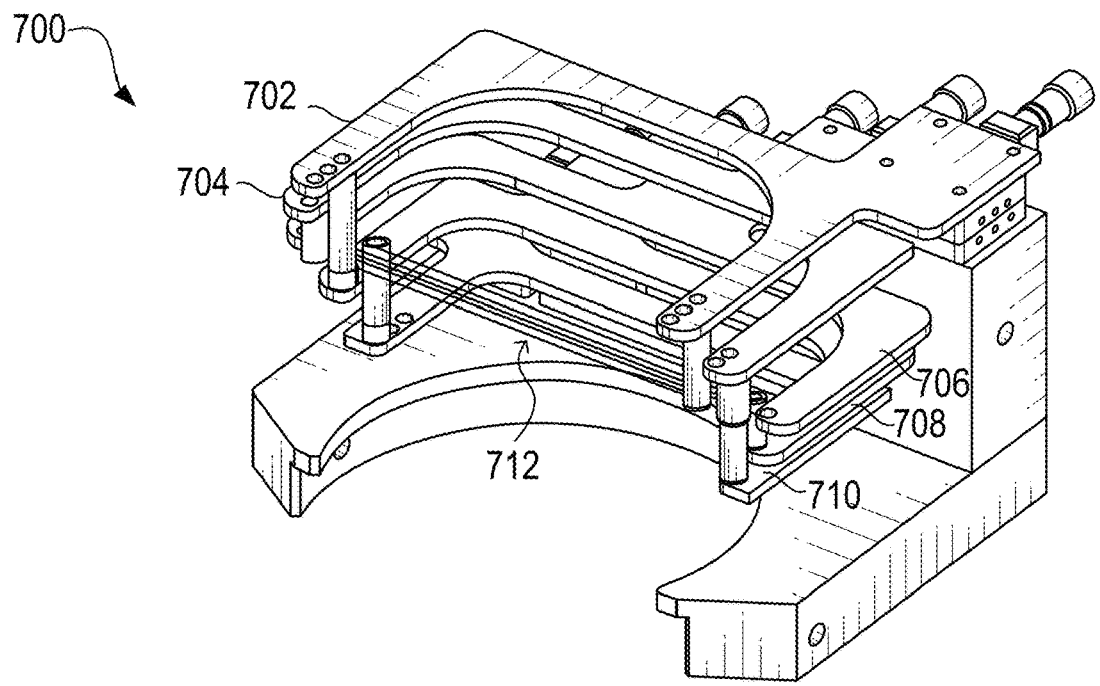
FIG. 7A is a 3D schematic view of a pupil plane filtering structure in accordance with some embodiments.
Figure 7B:
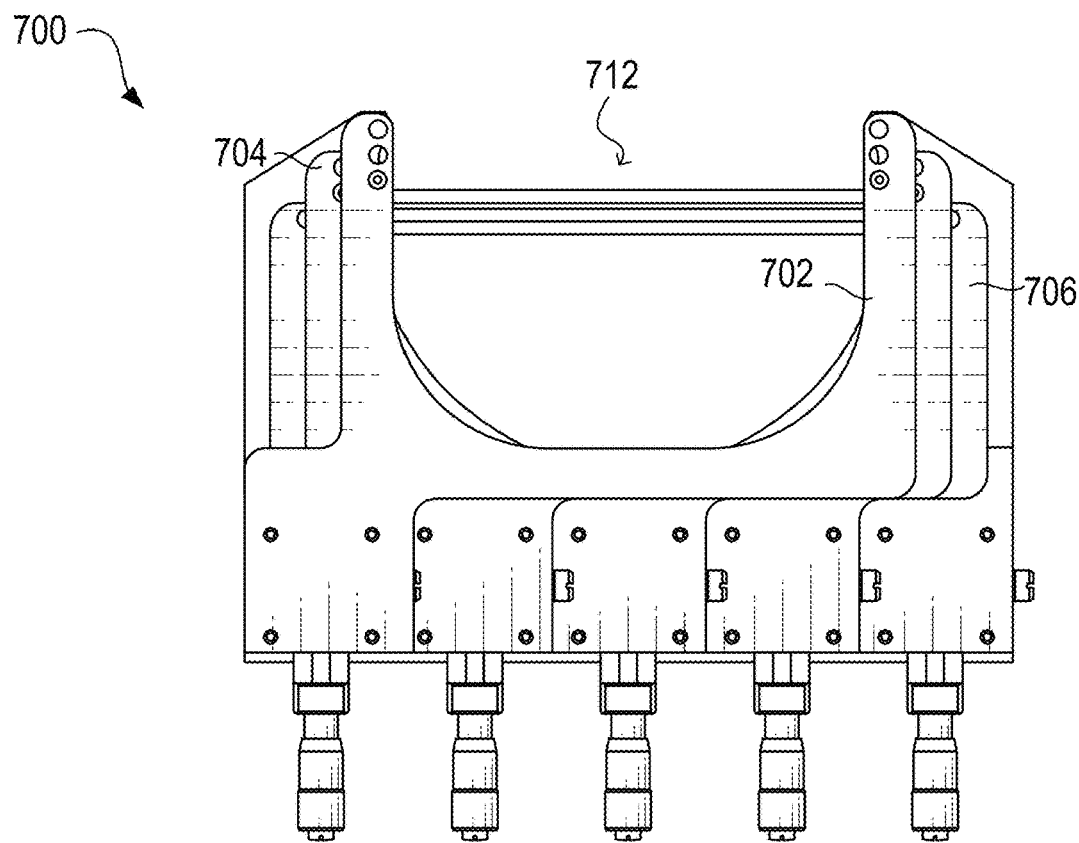
FIG. 7B is a top down view of the pupil plane filtering structure in accordance with some embodiments.
Figure 7C:
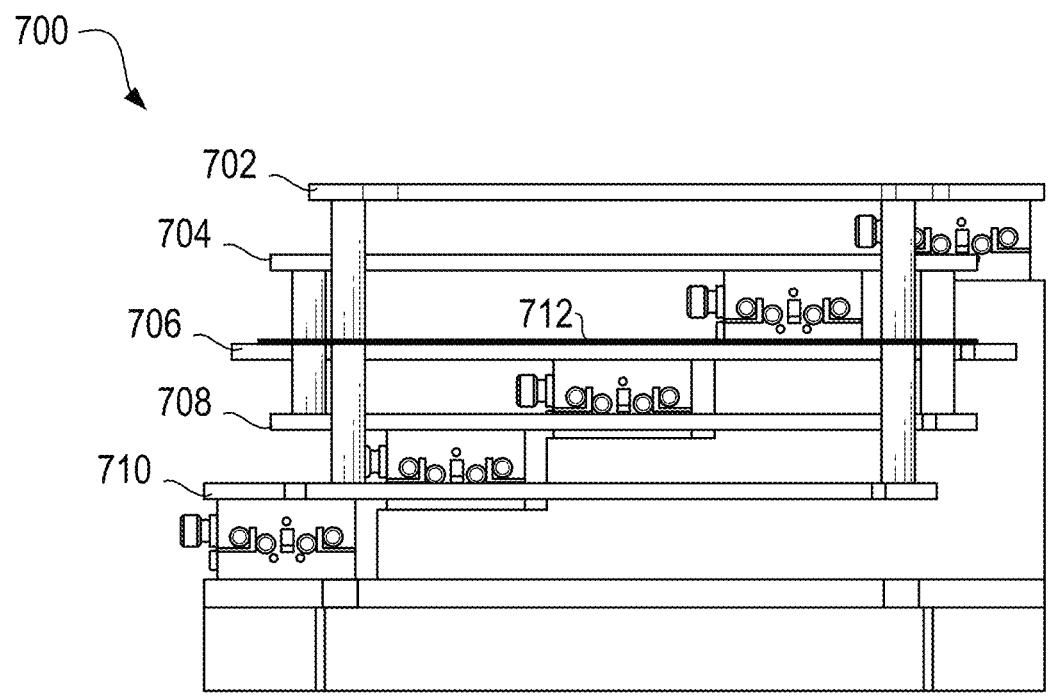
FIG. 7C is a front view of the pupil plane filtering structure in accordance with some embodiments.
Figure 7D:
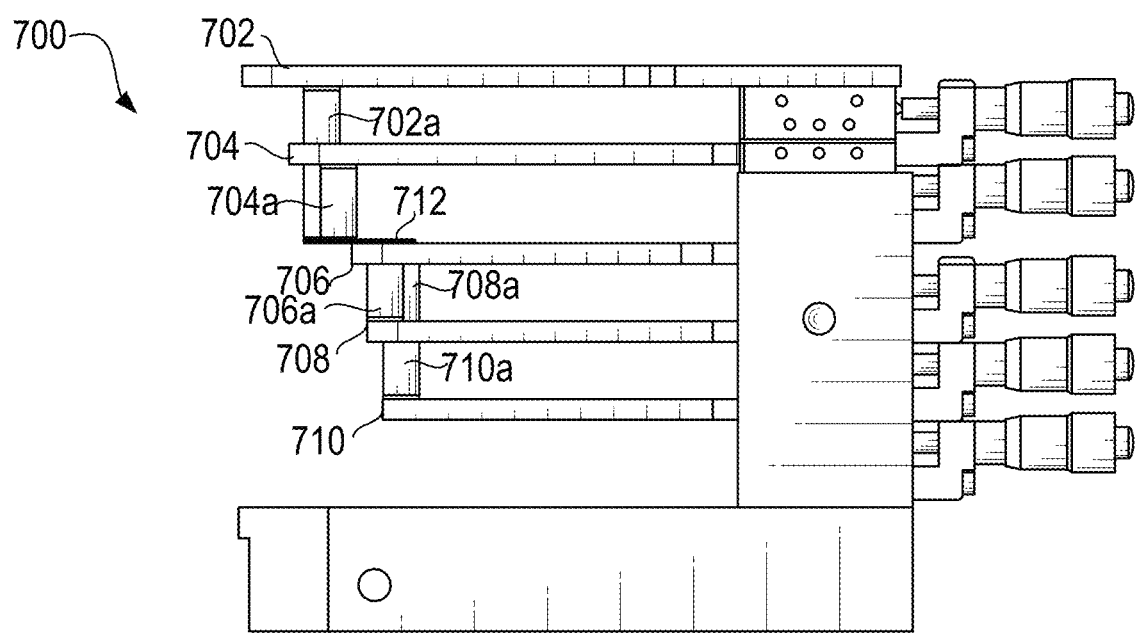
FIG. 7D is a side view of the pupil plane filtering structure in accordance with some embodiments.

FIGS. 7A-7D shows a mechanical spatial light modulator (SLM) 700 that can be positioned in a pupil plane (e.g., 122 or 218) to filter out the periodic structure of the sample. FIG. 7A is a 3D schematic view of the mechanical SLM 700. FIG. 7B is a top down view of the mechanical SLM 700. FIG. 7C is a front view of the mechanical SLM 700. FIG. 7D is a side view of the mechanical SLM 700. As shown in FIGS. 7A-7D, the mechanical SLM 700 can include a plurality of wires 712, such as five wires. Each of the wires 712 can be mounted on a respective "fork" structure (e.g., 702-710). Each of the fork structures 702-710 can be individually adjustable with a manual or motorized micrometer. Each of the fork structures 702-710 can be positioned in a different plane along a path of beam propagation, such as the detection light beam 109 or 205. Further, wires 712 can be attached to posts 702a-710a of varying length so that all wires are arranged in a same plane (or pupil plane).

In the disclosure, the wire positions can be adjusted using a calibration procedure, designed to minimize signal from the periodic structure. The calibration procedure can include one of or a combination of three approaches: (a) theoretical calculation of locations of periodic grating intensity peaks in a pupil plane; (b) taking an image of the pupil plane with a camera. In one embodiment the camera with imaging lens may be positioned on a fixture, which also includes a mirror that flips in and out of a main optical path, or a permanently positioned beam splitter; and (c) minimizing signal from a reference sample. The reference sample can contain a same periodic structure as a target sample, but be substantially free from defects.

Figure 8A:
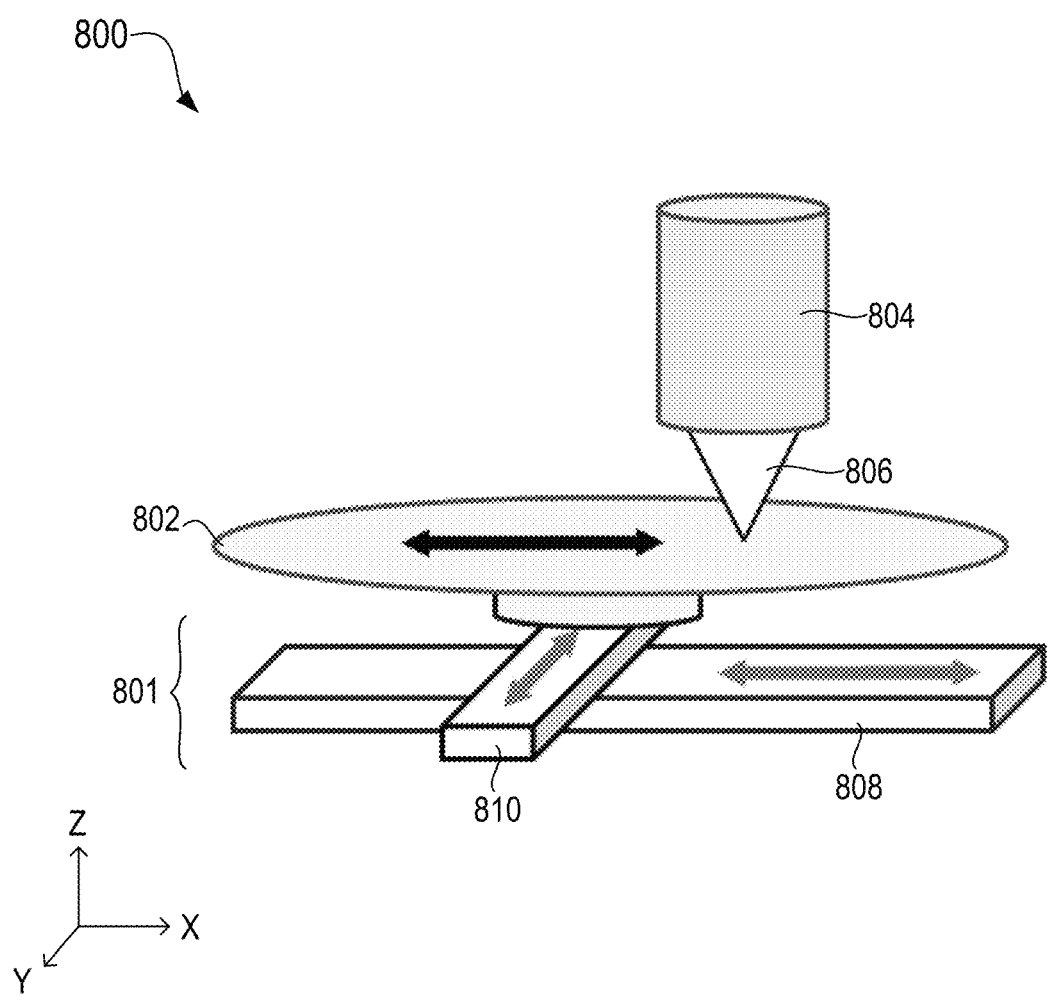
FIG. 8A is a schematic view of a scanning spectroscopic microscope in accordance with some embodiments.

FIG. 8A is a schematic view of a scanning spectroscopic microscope (or a system or a review station) 800 in accordance with some embodiments. As shown in FIG. 8A, the scanning spectroscopic microscope 800 can include a wafer stage (or stage) 801 and a detection portion 804. The detection portion 804 can have similar configurations to the spectroscopic microscope 100 or 200, where the detection portion 804 can generate an incident light beam 806. The incident light beam 806 can be directed to a sample wafer 802 and scattered or reflected by the sample wafer 802. The scanning spectroscopic microscope 800 thus can collect light scattered from the sample wafer and form images through a sensor (e.g., 126 or 222) for a region of the sample wafer 802, where the region can have one dimension of at least 100 mm. The wafer stage 801 can include a first translation track 808 along a X direction and a second translation track 810 along a Y direction. The wafer stage 801 can be commanded to move while the images are being collected so that the sample wafer 802 is moved by a fixed distance D between sequential frames of the images, where D×N=frame field-of-view size (FOV), and N is the number of different illumination modes. In a cycle of inspection, a first frame of the images can be captured by the scanning spectroscopic microscope 800 under a first illumination mode (e.g., a first wavelength, or a first polarization). The cycle can then proceed to capture a next frame under a second illumination mode (e.g., a second wavelength, or a second polarization). The cycle can repeat after N frames, and in each of the cycles the wafer stage 801 can translate by a distance equal to FOV.

In the disclosure, the system (e.g., 100, 200, or 800) can substantially use a "flood" approach, where full field-of-view on a sample can be illuminated, and imaged on all pixels of a sensor at a same time. This is in contrast to spot-scanning or line-scanning systems typical for some existing semiconductor wafer inspection systems. By implementing the "flood" approach, a sample can further be allowed to move with respect to the system. Further, by simultaneously changing the wavelength, the system can record multiple images of a same area on the sample with different wavelengths, and then "sew" or "stitch" the multiple images of the same area together, which can be shown in FIG. 8B. Alternatively, in another embodiment, the system may operate in a point-to-point mode, where the point-to-point mode can focus on a first area of a sample, scan through multiple wavelengths, and then move to a second area of the sample.

Figure 8B:
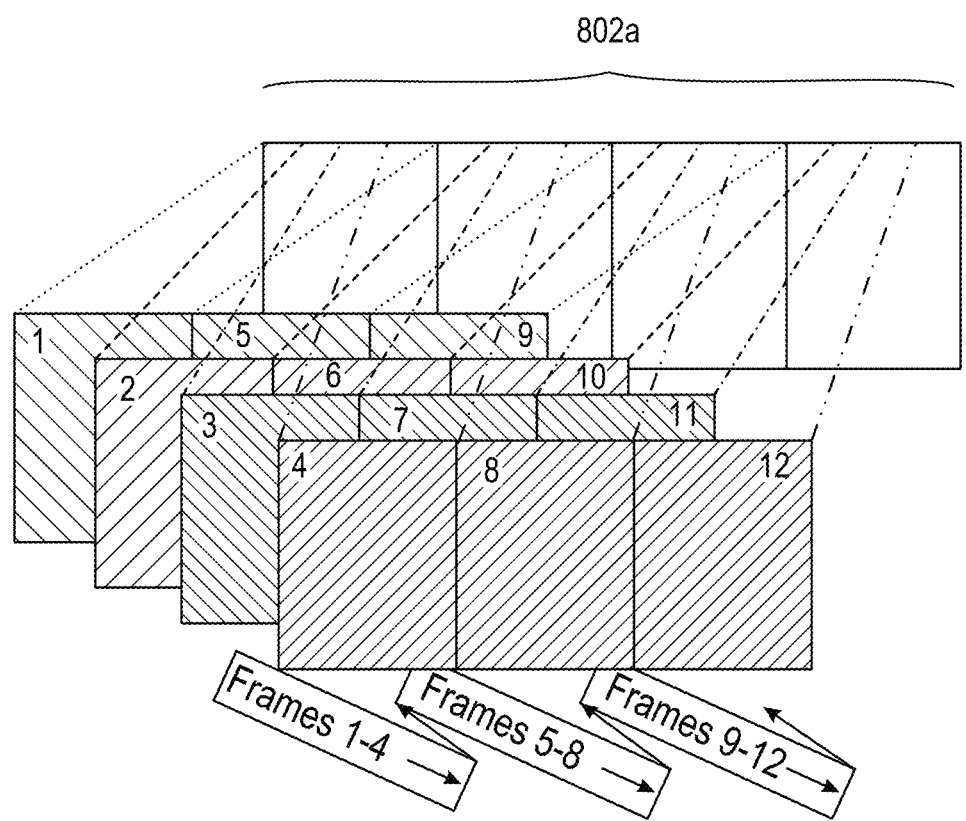
FIG. 8B is a schematic view of sequential frame acquisition with multiple illumination modes based on the scanning spectroscope microscope in accordance with some embodiments.

FIG. 8B illustrates a schematic view of sequential frame acquisition with multiple illumination modes operated by the system. In the disclosure, the system (e.g., 100, or 200, or 800) can be a point-to-point review station so that a plurality of areas (or regions) of the sample are inspected sequentially, and each of the areas can be inspected through multiple illumination wavelengths, or multiple polarizations. As shown in FIG. 8B, the system can inspect a region 802a of the sample wafer 802, where frames can be collected at equidistant time intervals. In an exemplary embodiment of FIG. 8B, four illumination modes can be applied. Thus, frame 1 can be collected at a time interval 't' with a first illumination mode (e.g., a wavelength of "violet"). Frame 2 can be collected at a time interval 't+Δ' with a second illumination mode (e.g., a wavelength of "green"). Frame 3 can be collected at a time interval 't+2Δ' with a third illumination mode (e.g., a wavelength of "yellow"), and frame 4 can be collected at a time interval 't+3Δ' with a fourth illumination mode (e.g., a wavelength of "red"). Frames 5-8 can repeat such a cycle, with frame 5 being collected at a time interval 't+4Δ' with the wavelength of "violet" and so on. When the whole acquisition is completed, "violet" frames 1, 5, and 9 can be stitched (or grouped) together to form a first continuous coverage of the region 802a under the first illumination mode, same goes for other frames under other illumination modes. For example, "green" frames 2, 6, and 10 can form a second continuous coverage of the region 802a under the second illumination mode.

In the disclosure, the system is a process-integrated sensitivity-based optical review system that is optimized for detecting the types of defects on periodic structures, which result in the change of the effective pitch of the periodic structures. One example is a zip line-like pattern collapse defect, which can double the effective pitch of a 2D-structure in one direction.

Existing CD-SEM systems use the method of resolving actual defects. Therefore the existing CD-SEM systems suffer from limited field-of-view and are inferior in terms of wafer throughput. In order to measure a meaningful portion of a wafer and establish defect statistics, CD-SEM system can review hours on a single wafer.

Existing scanning microscope-based optical inspection solutions do not provide a capability to perform sequential measurements with multiple channels, and therefore are inferior in terms of the amount of information they provide.

Existing spectroscopic ellipsometers and reflectometers have spot size that is too large to achieve useful SNR with a single defect. Furthermore, the existing spectroscopic ellipsometers and reflectometers measure specular reflection and changes in signal from a period pattern in a bright field. Such systems are further limited in defect signal may only be marginally different from background structure signal.

By rapidly scanning over wavelengths, the disclosed system provides spectroscopic information for individual sub-micron sized pixels, coupled with ability to filter out signal from a periodic pattern with a programmable Fourier plane filter.

Artificial intelligence (AI), sometimes called machine intelligence, is intelligence demonstrated by machines, unlike the natural intelligence displayed by humans and animals. Artificial intelligence has many applications in today's society. For example, AI has been used to develop and advance numerous fields and industries, including finance, healthcare, education, transportation, and more. Artificial Intelligence can be used to solve real-world problems by implementing the following processes/techniques: (1) Machine Learning, (2) Deep Learning, (3) Natural Language Processing, (4) Robotics, (5) Expert Systems, and (6) Fuzzy Logic.

Deep learning is a type of machine learning in which a model learns to perform classification tasks directly from images, text, or sound. Deep learning is usually implemented using a neural network architecture. The term "deep" refers to the number of layers in the network. The more layers the neural network has, the deeper the network is. Traditional neural networks contain only two or three layers, while deep networks can have hundreds. Deep learning is especially well-suited to identification applications such as face recognition, text translation, voice recognition, and advanced driver assistance systems, including, lane classification and traffic sign recognition.

Figure 9A:
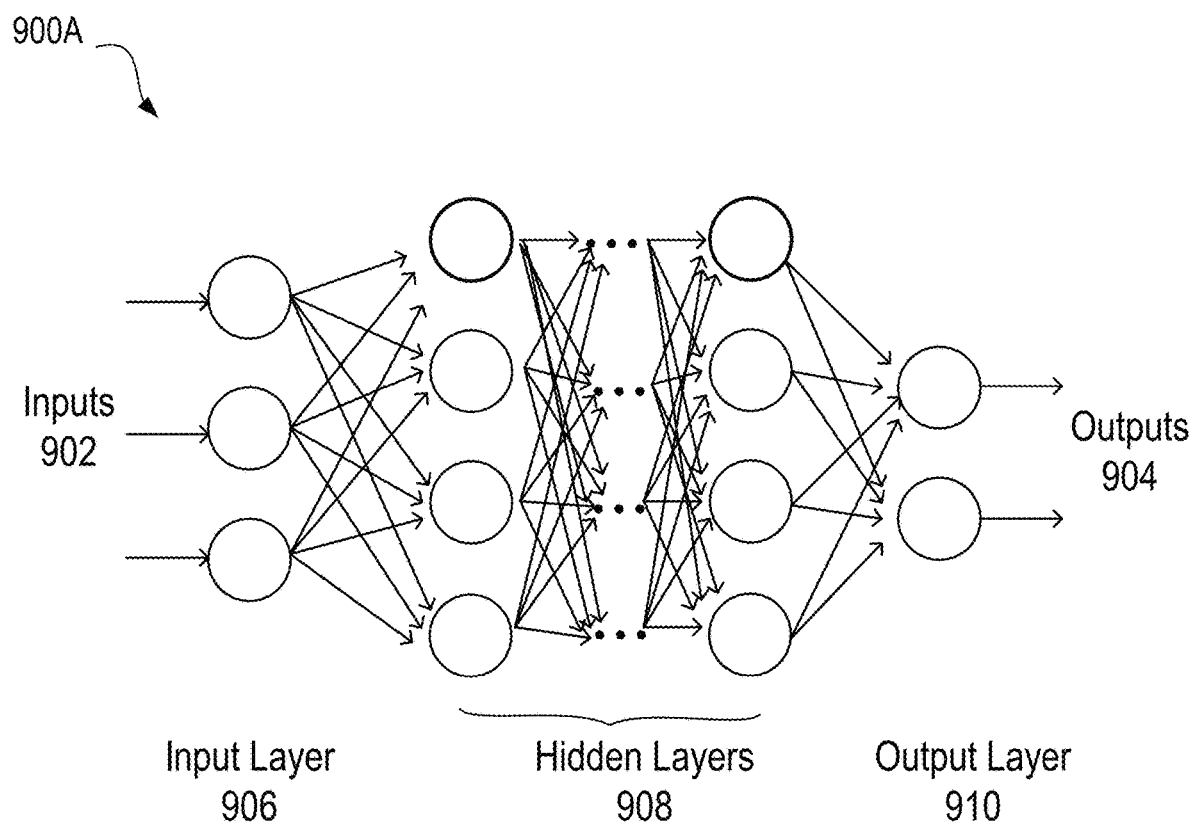
FIG. 9A is a schematic diagram of a deep learning model in accordance with some embodiments.

A deep neural network can combine multiple nonlinear processing layers, using simple elements operating in parallel and inspired by biological nervous systems. It can consist of an input layer, several hidden layers, and an output layer. The layers are interconnected via nodes, or neurons, with each hidden layer using the output of the previous layer as its input. FIG. 9A is a schematic view of a deep neural network 900A that can include an input 902, an input layer 906, a plurality of hidden layers 908, an output layer 910, and an output 904. As shown in FIG. 9A, the input 902 can move through the input layer 906, the hidden layers 908, the output layer 910, where each of the layers 906-910 is an mathematical manipulation, and the deep neural network 900A can find correct mathematical manipulations to turn the input 902 into the output 904. The mathematical manipulations can include a linear relationship or a non-linear relationship. The deep neural network 900A moves through the layers 906-910 by calculating the probability of an output of each layer of the layers 906-910.

Figure 9B:
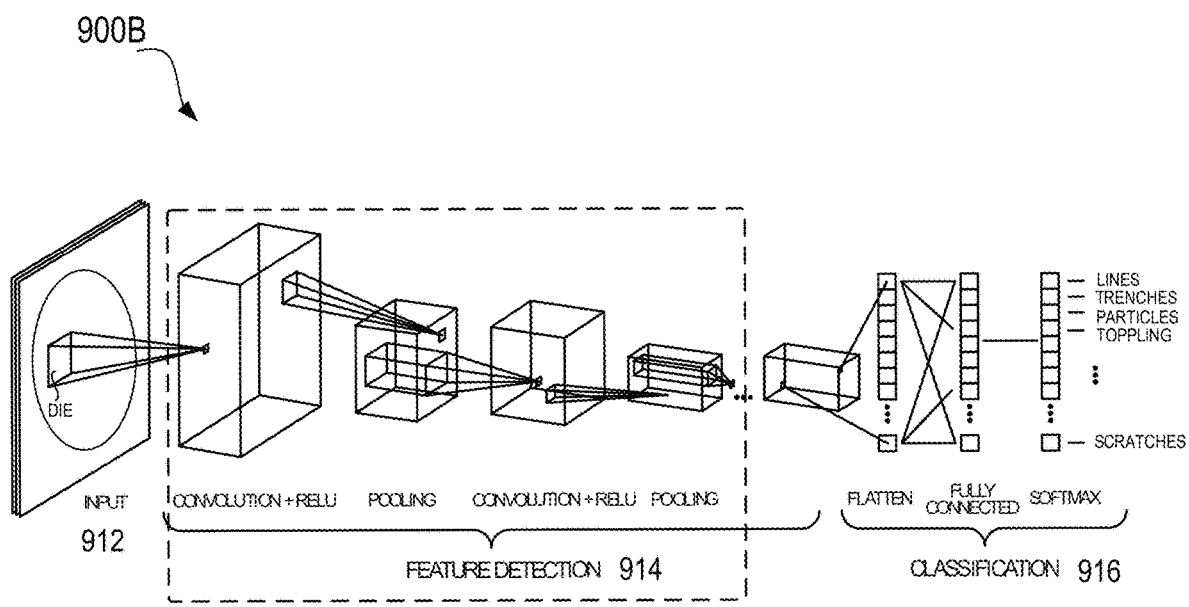
FIG. 9B is a schematic diagram of a convolutional neural network (CNN) model in accordance with some embodiments.

A convolutional neural network (CNN, or ConvNet) is one of the most popular algorithms for deep learning with images and video. Like other neural networks, a CNN is composed of an input layer, an output layer, and many hidden layers in between. In another way, the CNN can include feature detection layers and classification layers. As shown in FIG. 9B, a CNN 900B can include feature detection layers 914 and classification layers 916. The feature detection layers 914 can perform one of three types of operations on the data: convolution, pooling, or rectified linear unit (ReLU). The convolution operation (or convolution layer) puts input images (or input) 912 through a set of convolutional filters, each of the convolutional filters can activate certain features from the input images 912. The pooling operation (or pooling layer) simplifies the output by performing nonlinear downsampling, and reducing the number of parameters that the CNN network 900B needs to learn about. The rectified linear unit (ReLU) operation (or ReLU layer) allows for faster and more effective training by mapping negative values to zero and maintaining positive values. These three operations are repeated over the feature detection layers 914, where the feature detection layers 914 can include tens or hundreds of layers, with each layer learning to detect different features. After feature detection (or feature detection layers 914), the architecture of the CNN 900B shifts to classification (or classification layers 916). The classification layers 916 can perform one of three types of operations on the data: flatten, fully connected and softmax. As shown in FIG. 9B, the flatten operation (or flatten layer) is configured to change the shape of the data from a vector of two-dimensional matrixes (or three-dimensional matrices) into the correct format for the fully connected layers to interpret. The fully connected layer (FC) (or FC operation) is configured to output a vector of K dimensions where K is the number of classes that the CNN network 900B can predict. The vector of K dimension can contain the probabilities for each class of any image being classified. The softmax layer (or softmax operation) of the CNN network 900B is configured to apply a softmax function to provide the classification output.

Figure 10:
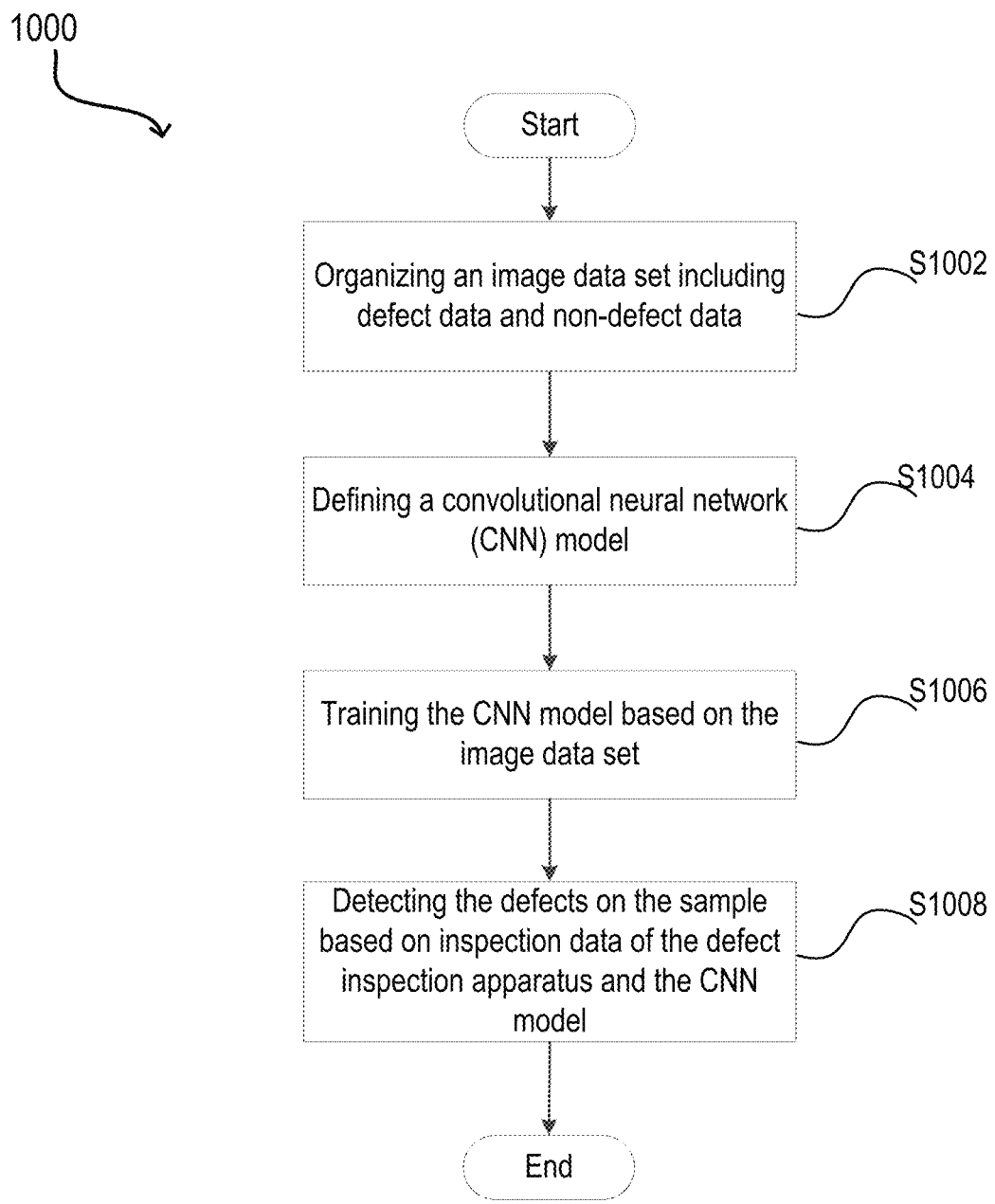
FIG. 10 is a flow chart of a process for forming a CNN model for defect detection in accordance with some embodiments.

FIG. 10 is a flow chart of a process 1000 for forming a CNN model for defect detection in a sample in accordance with some embodiments. As shown in FIG. 10, the process 1000 can begin at step S1002, where an image data set that includes defect data and non-defect data can be organized. For example, a first portion of the image data set can be defined for training the CNN model, and a second portion of the image data set can be defined for validating the CNN model. In some embodiments, the image data set that includes the defect data and the non-defect data can be generated from test samples, where the test samples include uniformly repeating structures, and signals of the uniformly repeating structures of the test samples can further be filtered out from the defect data and the non-defect data through the SLM (e.g., 700) of the defect inspection apparatus (e.g., 100 or 200). In some embodiments, the test samples can be semiconductor samples that have uniformly repeating structures, such as repeating lines, holes or other features. In addition, an exemplary embodiment of filtering out the uniformly repeating structures of the test samples can be illustrated as FIGS. 5A, 5B, 6A and 6B.

The process 1000 can then proceed to step S1004 to define a convolutional neural network (CNN) model. For example, convolution layers, filter sizes, dilation options, and other parameter of the CNN model can be defined. In a CNN model, convolutional layers are the major building blocks used in convolutional neural networks and mainly used for convolution operation. In order to perform a convolution operation, a filter is required to be defined. The filter can normally be a matrix. The convolution operation is that each pixel corresponding to a local area of an image covered by the filter is multiplied first and then accumulated. Repeated application of the same filter to an input can result in a map of activations called a feature map, indicating the locations and strength of a detected feature in an input, such as an image. In the CNN model, dilation convolution can be a convolution applied to an input with defined gaps. When the input is a two-dimensional image, dilation rate (or dilation option) k=1 is normal convolution, k=2 means skipping one pixel per input, and k=4 means skipping 3 pixels.

In step S1006, the CNN model can be trained based on the image data set. For example, the CNN model can be trained based on the first portion of the image data set. In order to train the CNN model, a learning rate can be defined at first. In machine learning, the learning rate is a tuning parameter in an optimization algorithm that determines the step size at each iteration while moving toward a minimum of a loss function. Since the learning rate influences to what extent newly acquired information overrides old information, the learning rate metaphorically represents the speed at which a machine learning model "learns". In setting a learning rate, there is a trade-off between the rate of convergence and overshooting. While the descent direction is usually determined from the gradient of the loss function, the learning rate determines how big a step is taken in that direction. A too high learning rate can make the learning jump over minima but a too low learning rate can either take too long to converge or get stuck in an undesirable local minimum.

Training a neural network typically consists of two phases: (i) a forward phase, where the input is passed completely through the network; and (ii) a backward phase, where gradients are backpropagated and weights are updated. During the forward phase, each layer of the neural network can cache any data (e.g., inputs, intermediate values, etc.) that are needed for the backward phase. This means that any backward phase must be preceded by a corresponding forward phase. During the backward phase, each layer can receive a gradient and also return a gradient. For example, each layer of the neural network can receive a gradient of loss with respect to its outputs ($\partial L/\partial out$) and return a gradient of loss with respect to its inputs ($\partial L/\partial in$).

In some embodiments, when the CNN model is trained, a validation operation can be performed to validate the CNN model based on the second portion of the image data set. An exemplary training result and an exemplary validation result can be illustrated in FIGS. 16 and 17.

The process 1000 can then proceed to step S1008 where defects on the sample can be detected based on inspection data generated by the defect inspection apparatus and the CNN model. For example, the inspection data that is captured by the inspection apparatus (e.g., 100 or 200) can be fed to the CNN model. The CNN model can subsequently characterize the inspection data and output the defect information. The sample can be a semiconductor sample that includes uniformly repeating structures, such as trenches, holes, or other repeating features. The inspection data of the defect inspection apparatus can be generated by filtering out signals of the uniformly repeating structures of the sample through a light modulator, such as a spatial light modulator (SLM) of the defect inspection apparatus that is illustrated in FIGS. 7A-7D.

In some embodiments, the inspection data can include first inspection data captured by a sensor (e.g., 126 or 222) of the defect inspection apparatus (e.g., 100 or 200). The first inspection data can be captured by scanning a region of the sample that is equal to a field of view (FOV) of the defect inspection apparatus, where the region of the sample can have one dimension of at least 100 um, and the first inspection data includes a plurality of images that are grouped or stitched together. In some embodiments, each of the images is generated under a different one of a respective illumination wavelength, a respective illumination mode, or a respective polarization through a light source of the defect inspection apparatus, which can be illustrated in FIG. 8B. For example, the first inspection data can include a first image that is formed of frames 1, 5, and 9 generated under a "violet" illumination mode, and a second image that is formed of frames 2, 6, and 10 generated under a "green" illumination mode.

Figure 11A:
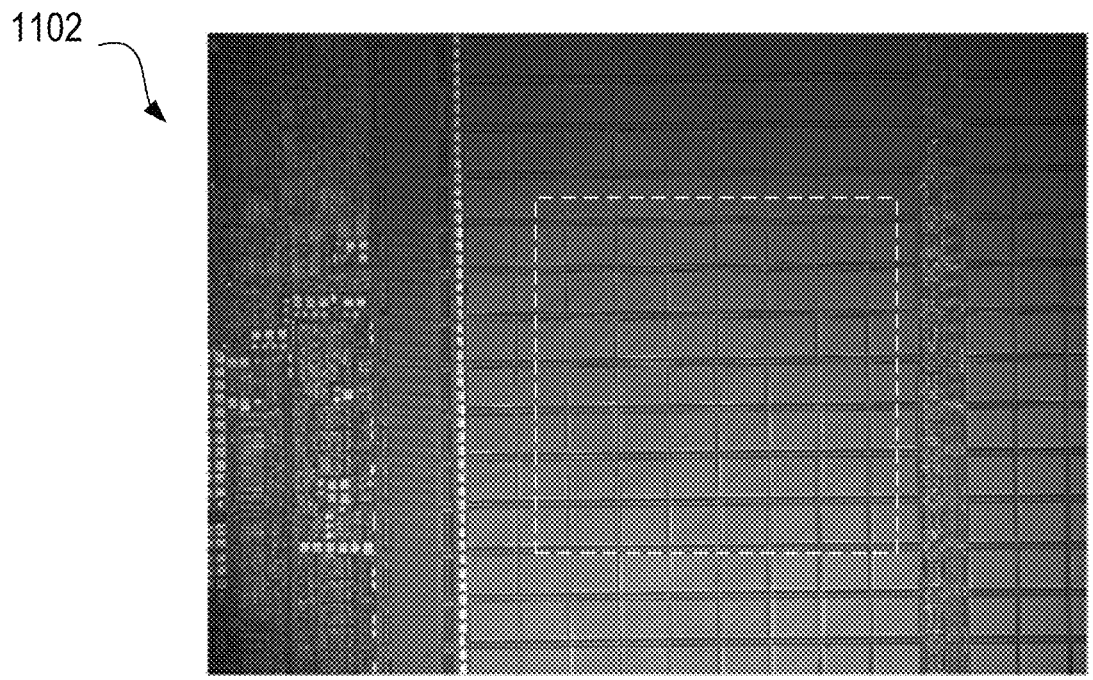
FIG. 11A is an exemplary training/validation date set without defects in accordance with some embodiments.
Figure 11B:
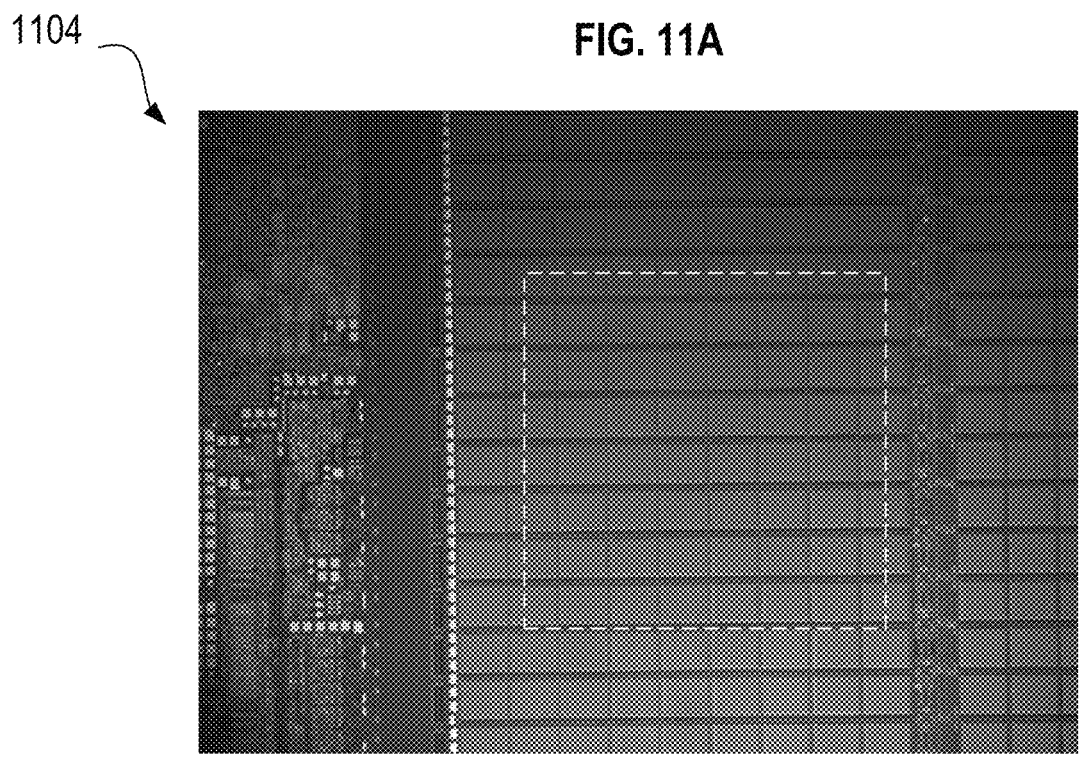
FIG. 11B is an exemplary training/validation date set with defects in accordance with some embodiments.

FIG. 11A is an exemplary test sample 1102 with defects for training or validating the CNN model. The test sample can be a semiconductor sample, such as a memory sample, a logic circuit sample, or other semiconductor device samples. As shown in FIG. 11A, the test sample 1102 can have repeating square structures, and also have scratch defects. FIG. 11B is an exemplary test sample 1104 without defects for training or validating the CNN model. The defect inspection apparatus (e.g., 100 or 200) can inspect the test samples and generate the image data set for training the CNN model. In addition, the uniformly repeating structures of the test samples can be filtered out by the spatial light modulator (SLM) of the defect inspection apparatus.

Figure 12A:
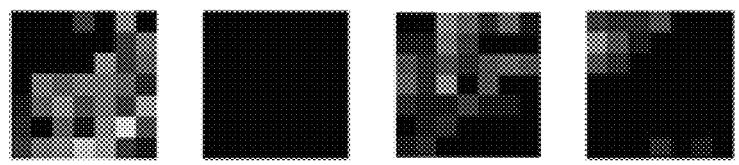
FIG. 12A is a first convolutional filter of the CNN model in accordance with some embodiments.
Figure 12A:
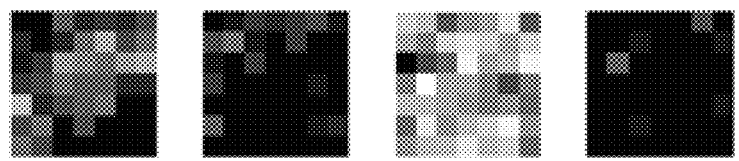
Figure 12B:
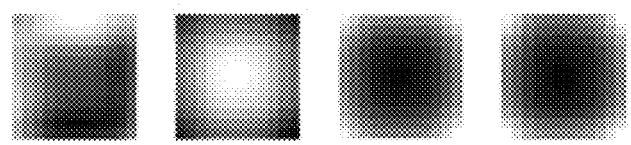
FIG. 12B are feature maps of data set receiving a filtering process based on the first convolutional filter in accordance with some embodiments.
Figure 12B:
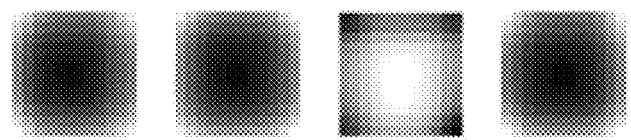

FIG. 12A is a 7×7 filter that can be applied in a first convolutional layer of the CNN model. FIG. 12B are exemplary feature maps that are generated when the 7×7 filter is applied to an input (e.g., inspection data of the defect inspection apparatus) with a dilation option of 2.

Figure 13A:
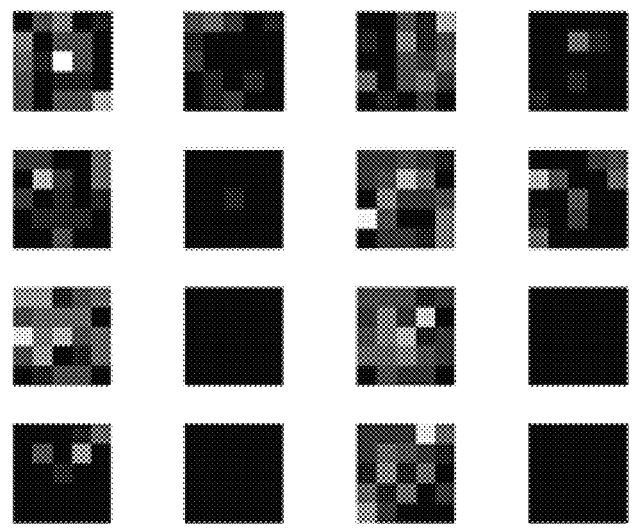
FIG. 13A is a second convolutional filter of the CNN model in accordance with some embodiments.
Figure 13B:
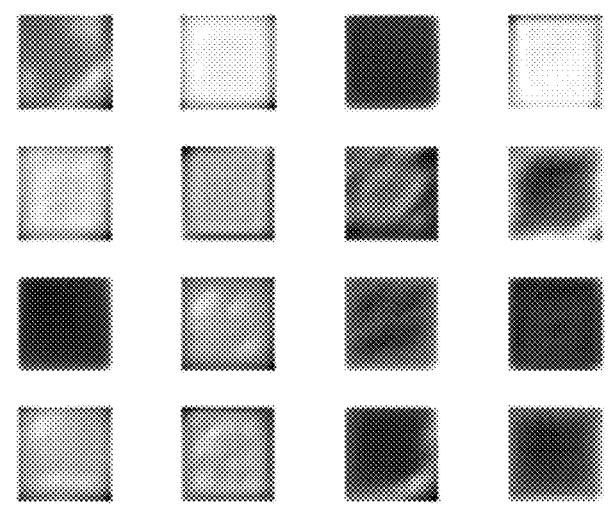
FIG. 13B are feature maps of data set receiving a filtering process based on the second convolutional filter in accordance with some embodiments.

FIG. 13A is a 5×5 filter that can be applied in a second convolutional layer of the CNN model. FIG. 13B are exemplary feature maps that are generated when the 5×5 filter is applied to an input with a dilation option of 2, where the input is an output of the first convolutional layer of the CNN model.

Figure 14A:
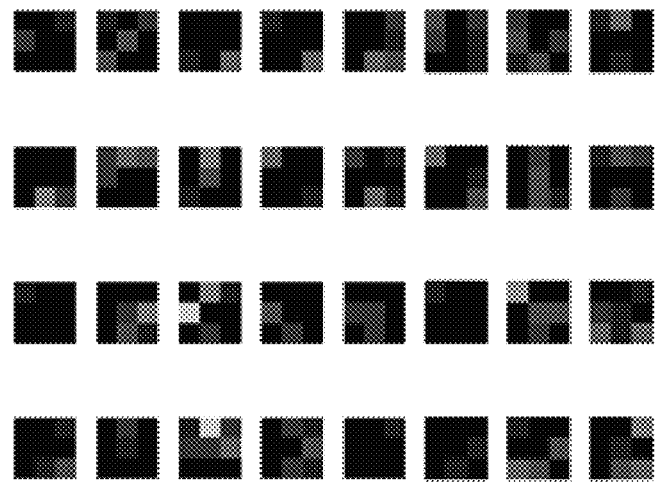
FIG. 14A is a third convolutional filter of the CNN model in accordance with some embodiments.
Figure 14B:
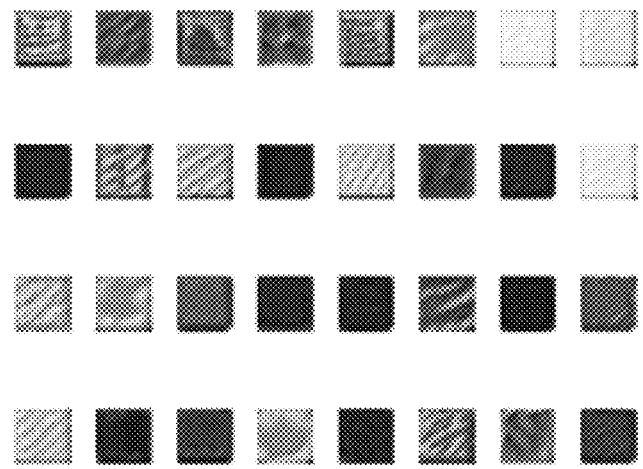
FIG. 14B are feature maps of data set receiving a filtering process based on the third convolutional filter in accordance with some embodiments.

FIG. 14A is a 3×3 filter that can be applied in a third convolutional filter of the CNN model. FIG. 14B are exemplary feature maps that are generated when the 3×3 filter is applied to an input with a dilation option of 2, where the input is an output of the second convolutional layer of the CNN model.

Figure 15A:
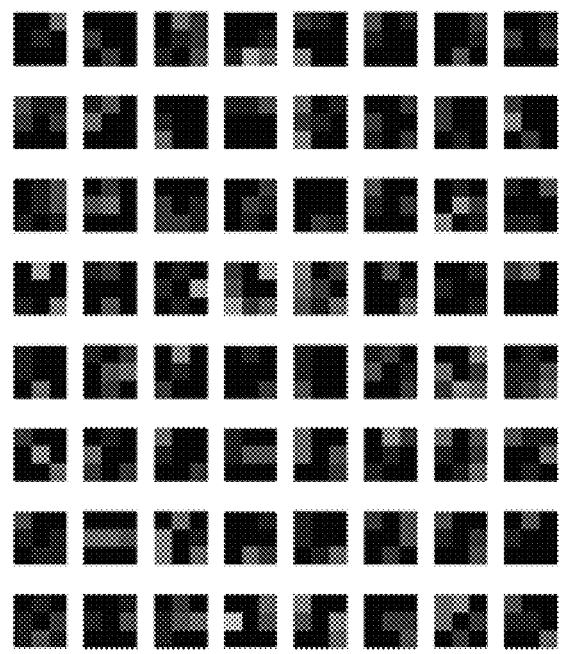
FIG. 15A is a fourth convolutional filter of the CNN model in accordance with some embodiments.
Figure 15B:
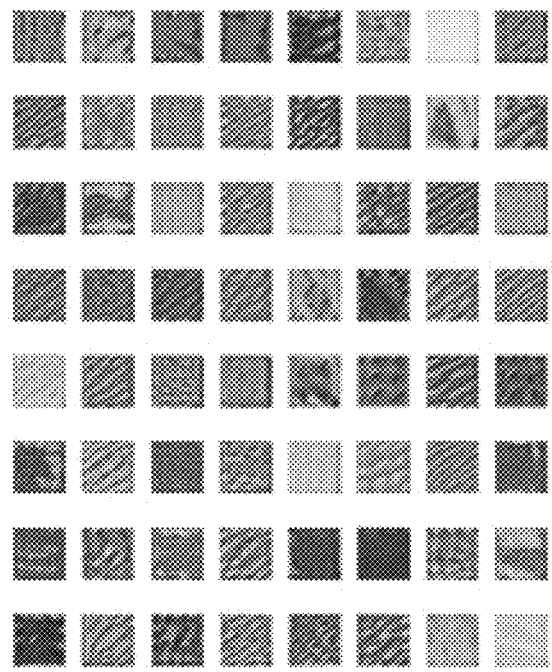
FIG. 15B are feature maps of data set receiving a filtering process based on the fourth convolutional filter in accordance with some embodiments.

FIG. 15A is a 3×3 filter that can be applied in a fourth convolutional filter of the CNN model. FIG. 15B are exemplary feature maps that are generated when the 3×3 filter is applied to an input with a dilation option of 2, where the input is an output of the third convolutional layer of the CNN model. As shown in FIG. 5B, the feature maps capture scratch defects of the test sample (e.g., 1102).

Figure 16:
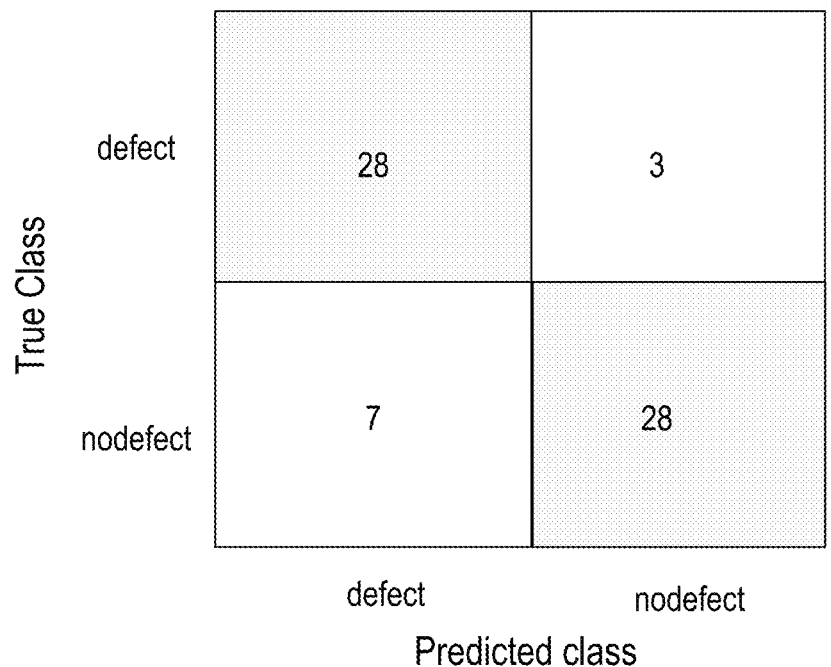
FIG. 16 is an exemplary classification result of training a CNN model in accordance with some embodiments.
Figure 17:
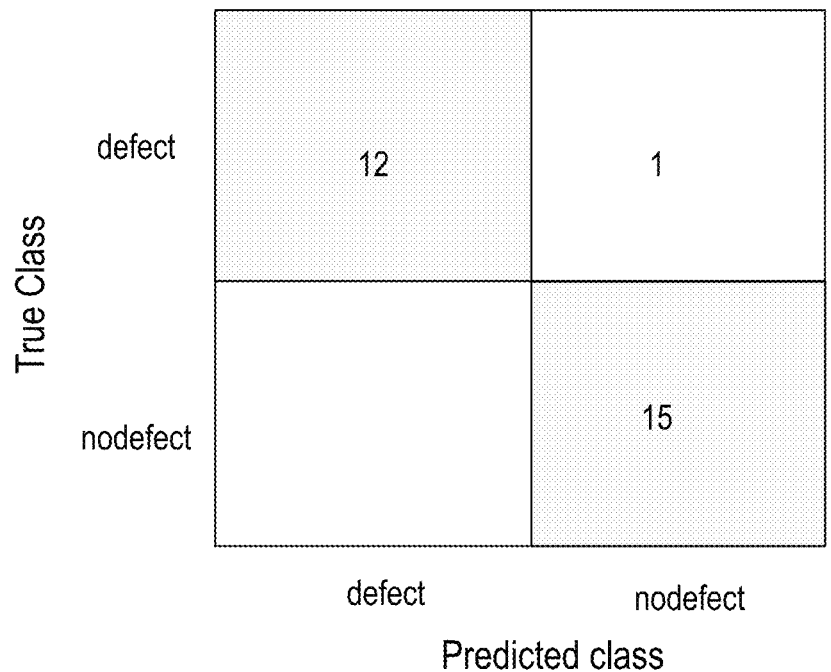
FIG. 17 is an exemplary classification result of testing a CNN model in accordance with some embodiments.

FIG. 16 is an exemplary classification result of the imaging date set for training the CNN model. As shown in FIG. 16, seven non-defects are classified as defects, and three defects are classified as non-defects. FIG. 17 is an exemplary classification result of the imaging date set for validating the CNN model. As shown in FIG. 17, after several training cycles, only one defect is classified as non-defect.

The Hough transform is a technique used to find shapes in a binary digital image. By Hough Transform, it is possible to find all kind of shapes that can be mathematical expressed, such as lines, circles and ellipses. For example, for a white pixel in a binary image, a plurality of straight lines can go through the white pixel, and each of straight lines can go through other white pixels in the same image. The more white pixels on a line the more is the line represented in the image, which is the principle of the Hough transform for straight lines.

As mentioned above a shape can be found if a mathematical expression can be set for the shape, and in this case where the shape is a straight line, an expression can be set as:

$$y = a \times x + b \qquad \text{Eq. (2)}$$

Where a is the slope, and b is where the line intersects the y-axis. These parameters, a and b, can be used to represent a straight line as single point (a, b) in the parameter-space spanned by the two parameters a and b. The problem by represent a line as a point in the (a, b) parameter-space, is that both a and b goes toward infinity when the line becomes more and more vertical, and thereby the parameter space becomes infinity large. Therefore it is desirable to find another expression of the line with some parameters that have limited boundaries. It is done by using an angle and a distance as parameters, instead of a slope and an intersection.

Figure 18:
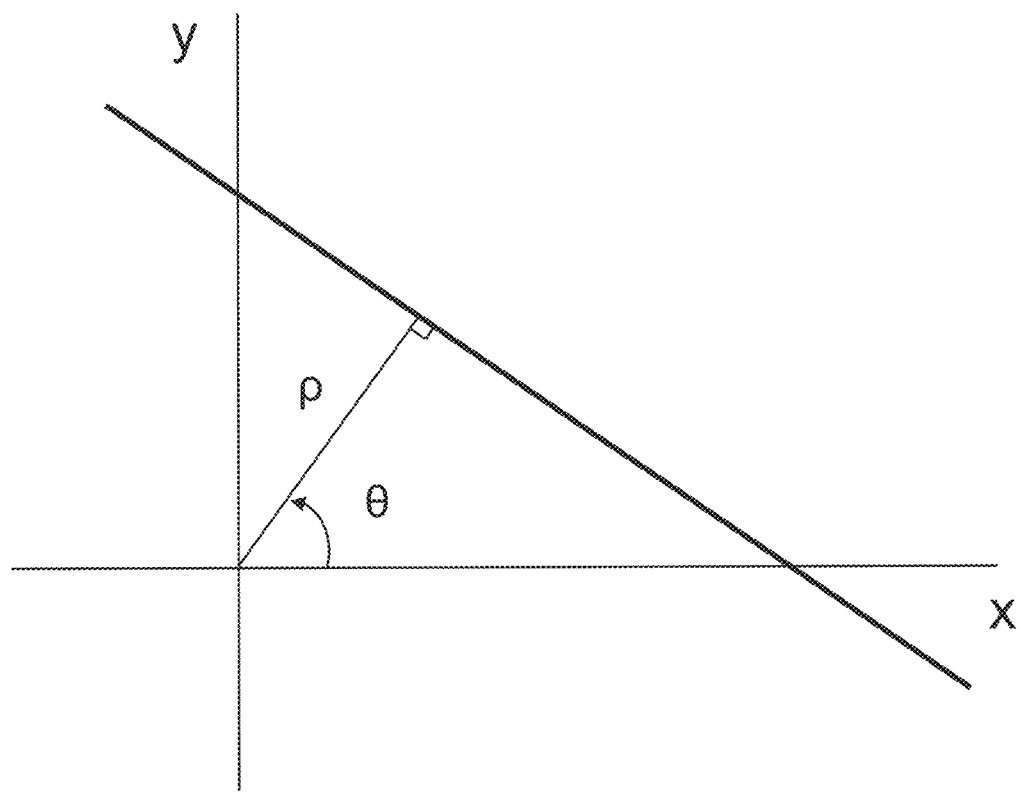
FIG. 18 is a schematic diagram of Hough Transform in accordance with some embodiments.

If a distance ρ (rho) is the distance from the origin to the line along a vector perpendicular to the line, and the angle θ (theta) is the angle between the x-axis and the ρ vector, as shown in FIG. 18, Equation (2) can be written as:

$$\rho = x \times \cos(\theta) + y \times \sin(\theta) \qquad \text{Eq. (3)}$$

Contrary to when the parameters are a and b, the values that ρ and θ can have are limited to: θ∈[0, 180] in degrees or θ∈[0, π] in radians, and ρ∈[−D, D] where D is the diagonal of the image. A line can then be transformed into a single point in the parameter space with the parameters θ and ρ, which is also called the Hough space.

If, instead of a line, having a pixel in an image with the position (x, y), infinity many lines can go through that single pixel. By using Equation (2) all these lines can be transformed into the Hough space, which gives a sinusoidal curve that is unique for that pixel. Doing the same for another pixel, gives another curve that intersect the first curve in one point, in the Hough space. This point represents the line, in the image space, that goes through both pixels. This can be repeated for all the pixels on the edges, in an edge detected image.

In Hough transform, a point in a picture plane (or parameter space) corresponds to a sinusoidal curve in a parameter plane (or Hough space). A point in the parameter plane (or Hough space) corresponds to a straight line in the picture plane (or parameter space). Points lying on the same straight line in the picture plane correspond to curves through a common point in the parameter plane. Points lying on the same curve in the parameter plane correspond to lines through the same point in the picture plane.

FIGS. 19A, 19B, 19C, 20A, 20B, 20C, 21A, 21B, 21C, 22A, 22B, 23A, 23B, 23C, 24A, 24B, 24C, 25A, 25B, and 25C illustrate intermediate steps for defect detection in a sample based on Hough transform.

Figure 19A:
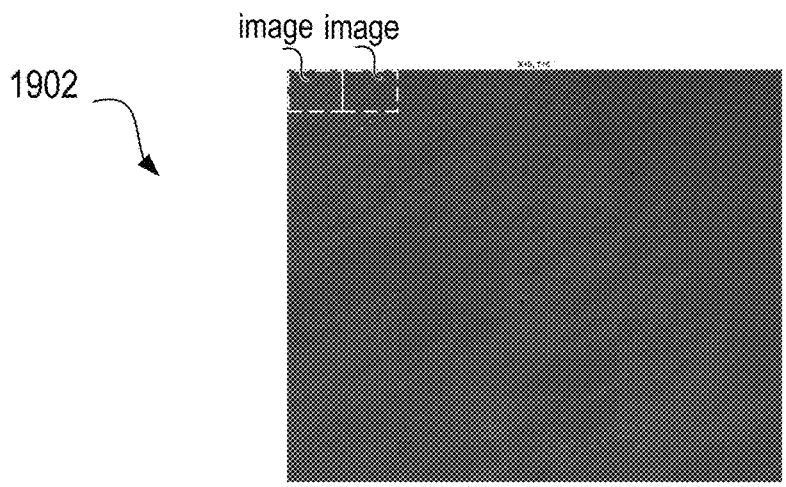
FIG. 19A is a first inspection image captured by a defect inspection apparatus in accordance with some embodiments.
Figure 19B:
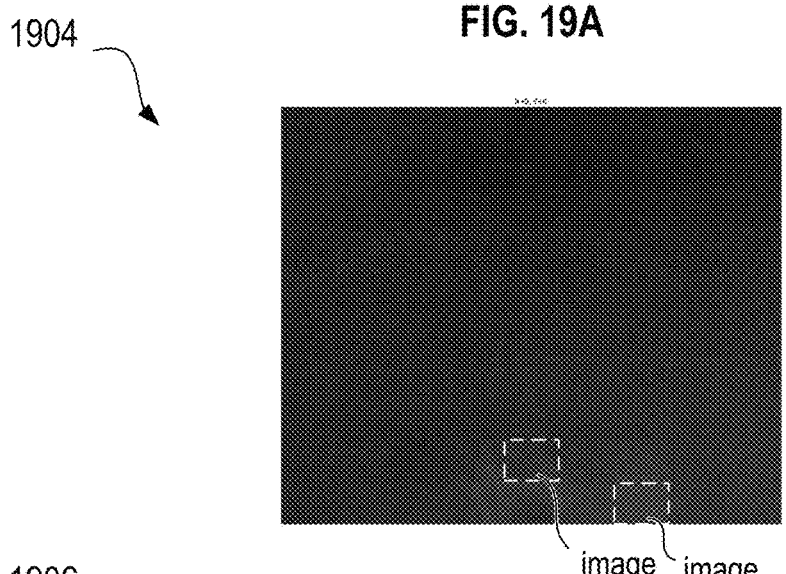
FIG. 19B is a second inspection image captured by a defect inspection apparatus in accordance with some embodiments.
Figure 19C:
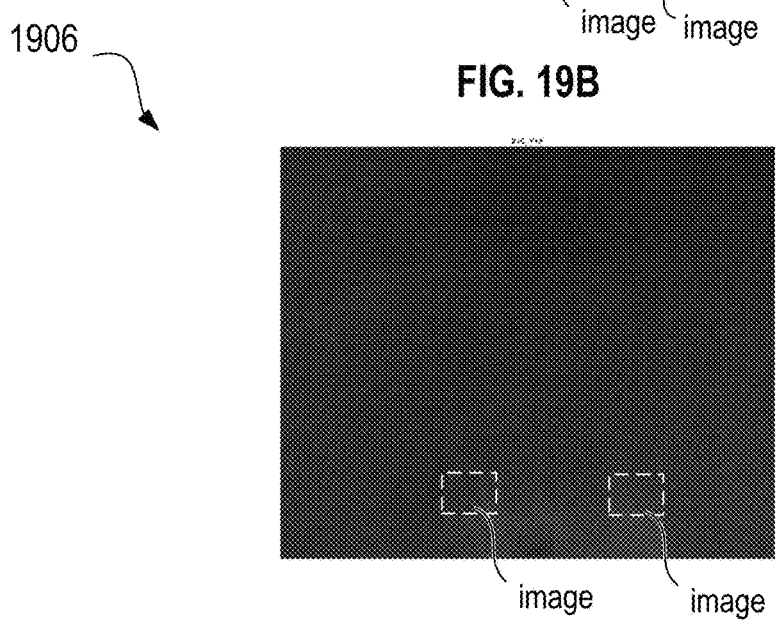
FIG. 19C is a third inspection image captured by a defect inspection apparatus in accordance with some embodiments.

In FIGS. 19A, 19B and 19C, three inspection images 1902, 1904, and 1906 can be captured from different samples (e.g., different dies) through the defect inspection apparatus 100 or 200 that are described above. For example, the three inspection images 1902, 1904, and 1906 can be captured from three respective dies of a semiconductor wafer. In some embodiments, each of the inspection images 1902, 1904, and 1906 can include images that are captured from the associated sample and are joined together to form the corresponding inspection image. Each of the images can be captured by a sensor (e.g., 126 or 222) of the defect inspection apparatus (e.g., 100 or 200) from a different region of the associated sample, where the different region of the associated sample can have one dimension of at least 100 um. In addition, each of the images can be generated by filtering out signals of the uniformly repeating structures of the associated sample through a spatial light modulator (SLM) (e.g., 700) of the defect inspection apparatus. Further, each of the images can be formed of a plurality of sub images that are grouped or stitched together, where each of the sub images can be generated under a different one of a respective illumination wavelength, a respective illumination mode, or a respective polarization through a light source of the defect inspection apparatus. FIG. 8B illustrates an exemplary image that is formed of sub images. For example, the exemplary image can include a first sub mage that is formed of frames 1, 5, and 9 generated under a "violet" illumination mode, and a second sub image that is formed of frames 2, 6, and 10 generated under a "green" illumination mode.

Figure 20A:
FIG. 20A is a first inspection image that is processed by a filtering process in accordance with some embodiments.
Figure 20B:
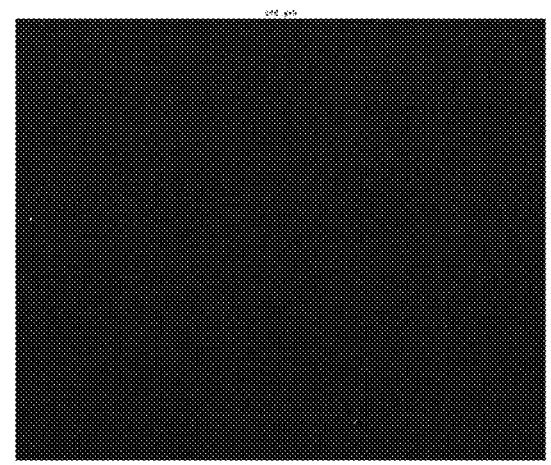
FIG. 20B is a second inspection image that is processed by a filtering process in accordance with some embodiments.
Figure 20C:
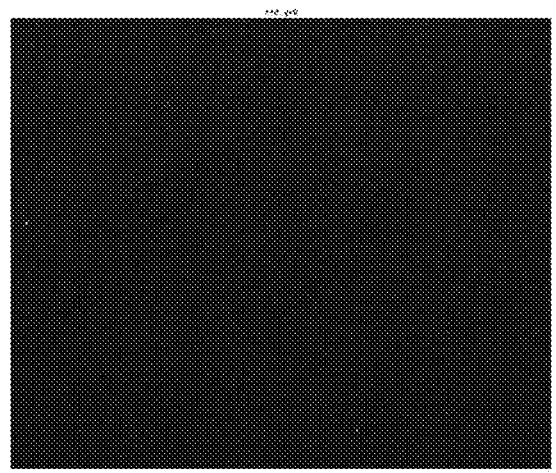
FIG. 20C is a third inspection image that is processed by a filtering process in accordance with some embodiments.
Figure 21A:
FIG. 21A is a first inspection image that is processed by a histogram equalization process in accordance with some embodiments.
Figure 21B:
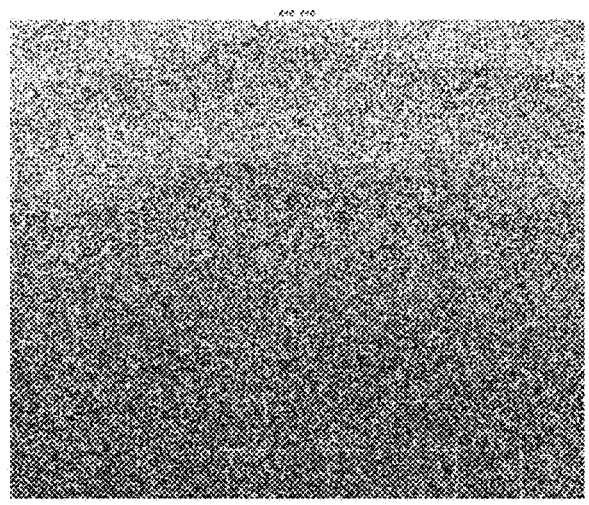
FIG. 21B is a second inspection image that is processed by a histogram equalization process in accordance with some embodiments.
Figure 21C:
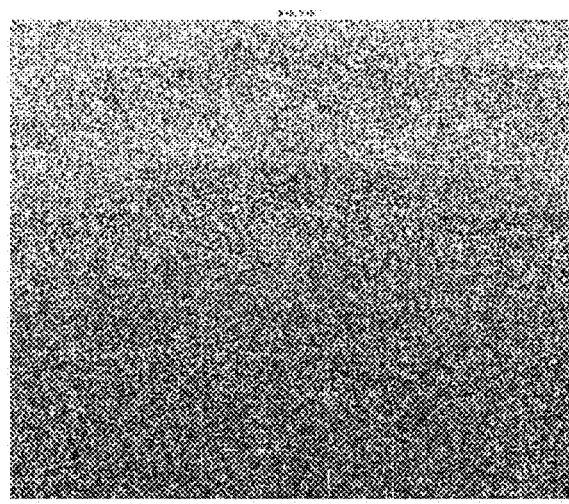
FIG. 21C is a third inspection image that is processed by a histogram equalization process in accordance with some embodiments.

In FIGS. 20A, 20B, and 20C, the three inspection images 1902, 1904, and 1906 can receive a filtering process to filter out big features that have sizes more than 1.3 um based on a signal processing filter. In some embodiments, the signal processing filter can be a range filter that is configured to filter out pixels that have values more than a threshold value. As shown in FIGS. 20A, 20B, and 20C, when the filtering process is completed, the three inspection images 1902, 1904, and 1906 become three inspection images 2002, 2004, and 2006 in which big features that have sizes more than 1.3 um are removed.

Further, a histogram equalization process can be performed on the inspection images 2002, 2004, and 2006 so as to enhance an image contrast of the inspection images. When the histogram equalization process is completed, the inspection images 2002, 2004, and 2006 become inspection images 2102, 2104, and 2106, which can be shown in FIGS. 21A, 21B, and 21C.

Figure 22A:
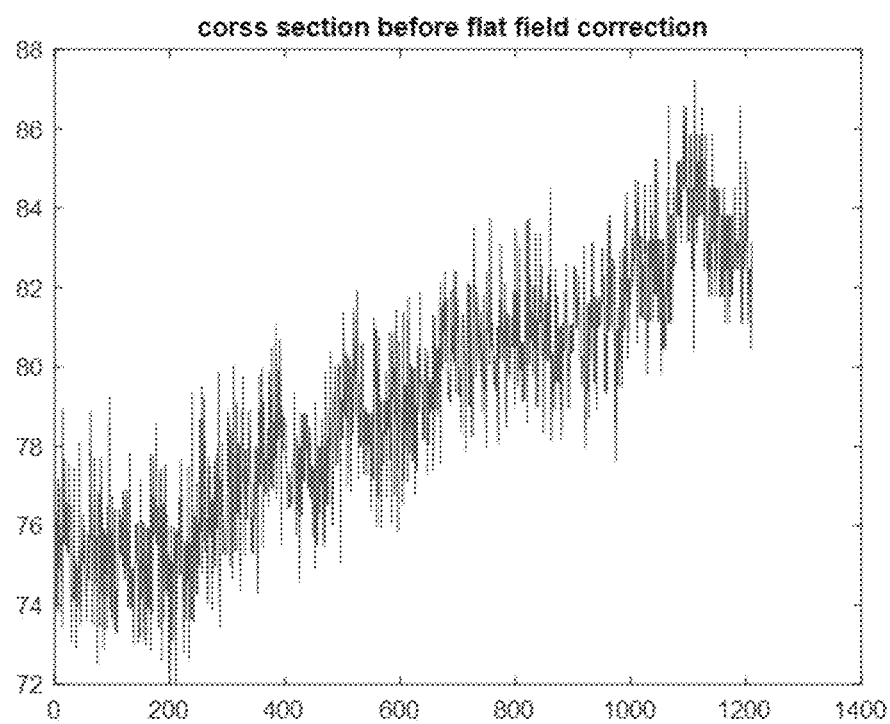
FIG. 22A is an exemplary contour profile of an inspection image before receiving an image flat filed correction.
Figure 22B:
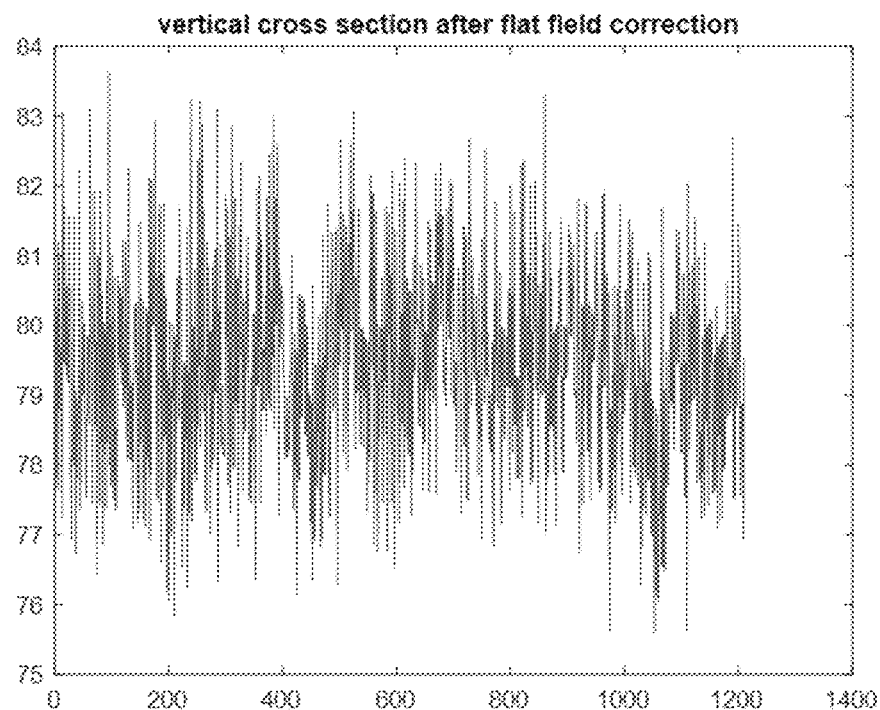
FIG. 22B is an exemplary contour profile of an inspection image after receiving an image flat filed correction.

The inspection images 2102, 2104, and 2106 can further receive an image flat field correction. FIG. 22A shows a cross-section that is obtained before the flat field correction, and FIG. 22B shows a cross-section that is obtained after the flat field correction. The flat field correction can be configured to improve quality in digital imaging. The flat field correction can cancel the effects of image artifacts caused by variations in the pixel-to-pixel sensitivity of the detector and by distortions in the optical path. Thus, the flat field correction is a standard calibration procedure in image processing.

Figure 23A:
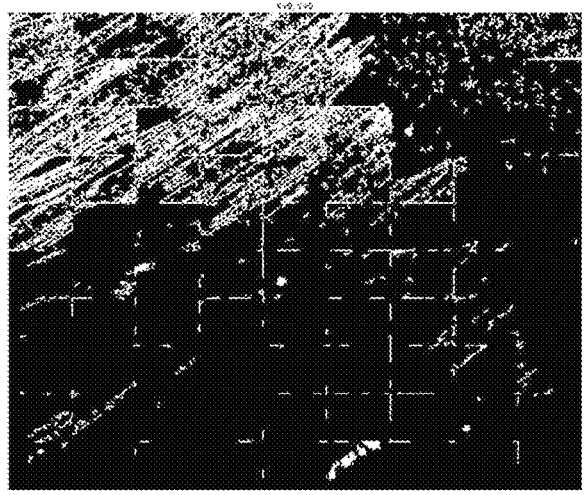
FIG. 23A is a first inspection image that is processed by a binary enhancement process in accordance with some embodiments.
Figure 23B:
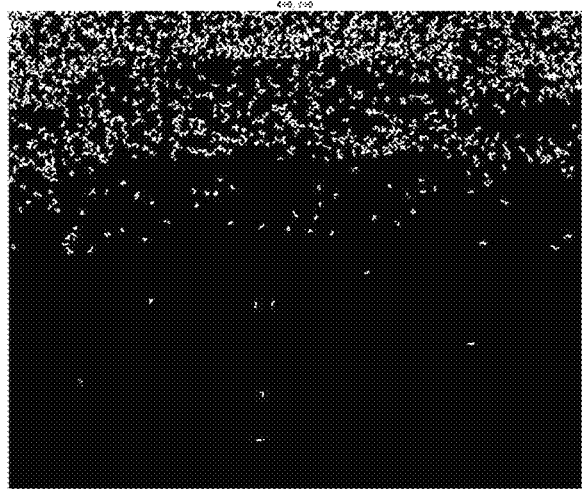
FIG. 23B is a second inspection image that is processed by a binary enhancement process in accordance with some embodiments.
Figure 23C:
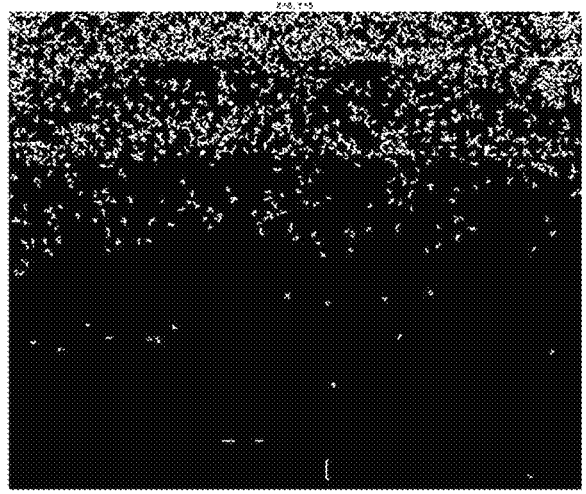
FIG. 23C is a third inspection image that is processed by a binary enhancement process in accordance with some embodiments.

In FIGS. 23A, 23B, and 23C, a binary enhancement process can be performed on the inspection images that receive the image flat field correction so as to remove small features that have a size less than 4 um². FIGS. 23A, 23B, and 23C show three inspection images 2302, 2304, and 2306 that are processed with the binary enhancement process (or binary contrast enhancement). The binary enhancement process can allow the inspection images to be easily inspected by a human observer or be displayed in a specific manner, so that the conveyed information is maximized. This can help a human or computer to extract the desired information. After processing the inspection image with the binary enhancement process, the information part of the data is retained and the rest is discarded.

Figure 24A:
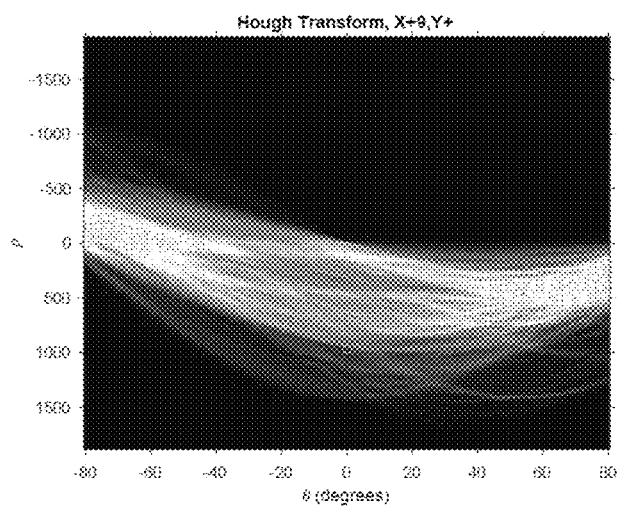
FIG. 24A is a first inspection image that is processed by a Hough Transform in accordance with some embodiments.
Figure 24B:
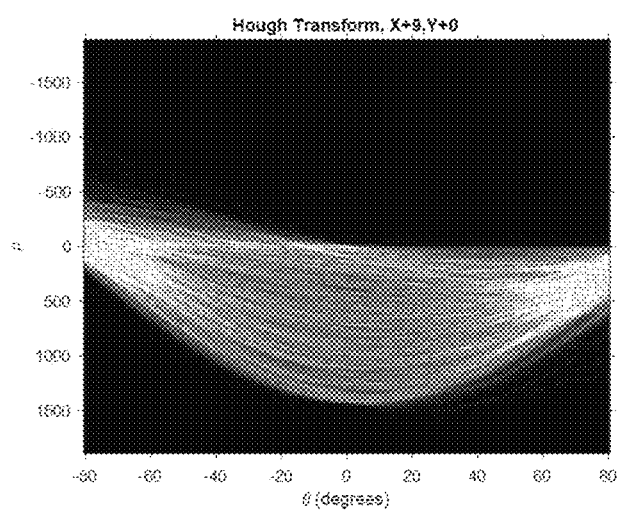
FIG. 24B is a second inspection image that is processed by a Hough Transform in accordance with some embodiments.
Figure 24C:
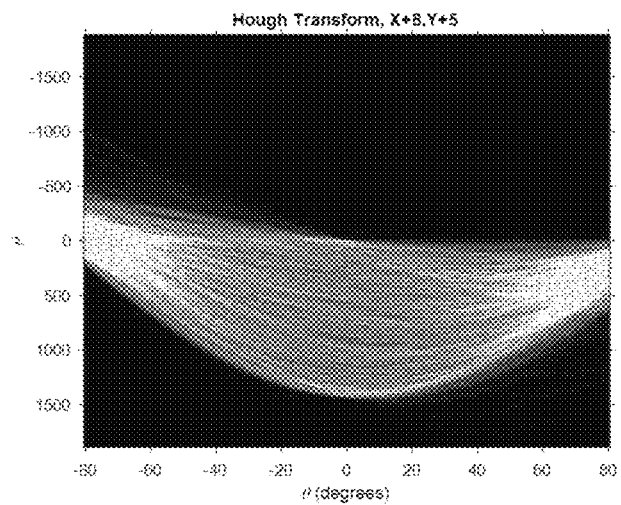
FIG. 24C is a third inspection image that is processed by a Hough Transform in accordance with some embodiments.

The Hough transform can subsequently be applied on the three inspection images 2302, 2304, and 2306 that are processed with the binary enhancement process. FIGS. 24A, 24B, and 24C show transformation results of the Hough transform on the three inspection images 2302, 2304, and 2306, where three outputs 2402, 2404, and 2406 can be generated respectively. The outputs 2402, 2404, and 2406 provide information of lines and length strength versus angles between +80 degrees and −80 degrees. The points highlighted in the outputs 2402, 2404, and 2406 can present lines detected in the inspection images 2302, 2304, and 2306. As shown in FIGS. 24A, 24B, and 24C, most of the lines are positioned around +80 degree and −80 degree. However, the output 2402 also has points positioned around zero degree, which means that the inspection image 2302 can have vertical lines. Further, the points in the output 2402 have a wider distribution along the θ (degree) than other two outputs 2404 and 2406. As shown in FIGS. 23A, 23B and 23C, the inspection image 2302 shows more scratch defects or a larger scratch area than the inspection images 2304 and 2306. Accordingly, the output 2402 that is originated from the inspection image 2302 provides a wider distribution of points along the θ (degree) than other two outputs 2404 and 2406.

Figure 25A:
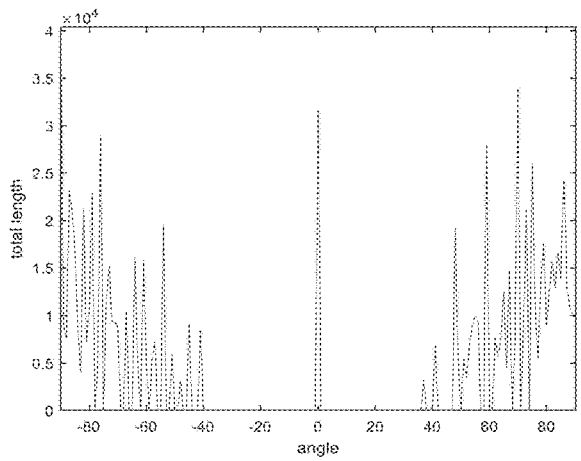
FIG. 25A is an inspection result from a first inspection imaged that is processed by a Hough Transform in accordance with some embodiments.
Figure 25B:
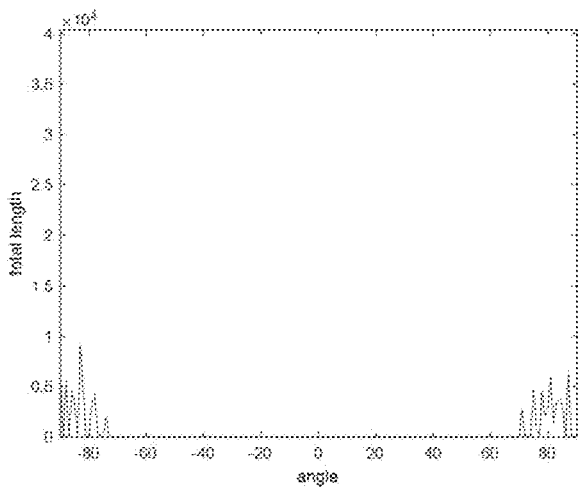
FIG. 25B is an inspection result from a second inspection image that is processed by a Hough Transform in accordance with some embodiments.
Figure 25C:
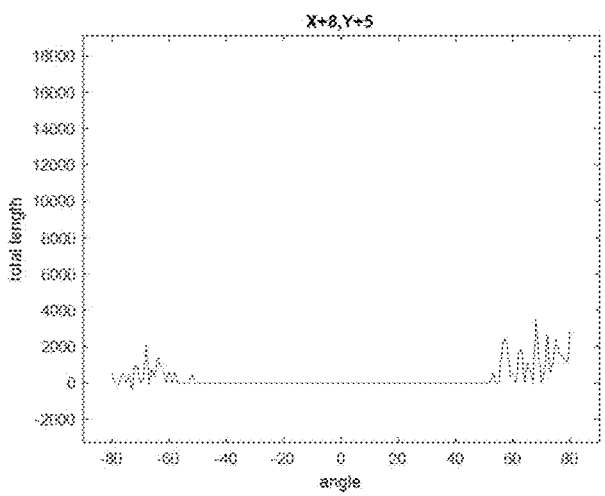
FIG. 25C is an inspection result from a third inspection image that is processed by a Hough Transform in accordance with some embodiments.

FIGS. 25A, 25B and 25C are statistical summaries of total line length at each angle for the outputs 2402, 2404, and 2406. The statistical summaries 2502, 2504, and 2506 are summarized based on the outputs 2402, 2404, and 2406 respectively. As shown in FIGS. 25A, 25B and 25C, the statistical summary 2502 provides a larger total line length than other two summaries 2504, and 2506. The summary 2502 is obtained from the inspection image 2402 that originally comes from 19A, and the larger line length can demonstrate that more defects are detected in the inspection image 19A.

The various embodiments described herein offer several advantages over related methods to detect defects in semiconductor samples. In the disclosure, uniformly repeating structures in the semiconductor samples can be filtered out by a mechanic spatial light modulator of the defect inspection apparatus. Thus signals of the defects in the semiconductor sample can be enhanced and be captured by the defect inspection apparatus in an easier way. In addition, AI methods, such as a CNN model, or signal processing methods, such as a Hough transform, can be applied to analyze inspection images that are generated by the defect inspection apparatus. The CNN model or the Hough transform can improve not only the detect efficiency and the detect accuracy.

Obviously, numerous modifications and variations are possible in light of the above teachings. It is therefore to be understood that within the scope of the appended claims, the invention may be practiced otherwise than as specifically described herein. Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A method for detecting defects on a sample based on a defect inspection apparatus, comprising:
    capturing an inspection image through the defect inspection apparatus,
    performing an enhancement process on the inspection image to improve a contrast of the inspection image and remove noisy features of the inspection image; and
    performing a Hough transform on the inspection image that receives the enhancement process so as to identify defects on the sample, wherein:
    the sample includes uniformly repeating structures, and
    the inspection image is captured by filtering out signals of the uniformly repeating structures of the sample.

2. The method of claim 1, wherein the capturing the inspection image through the defect inspection apparatus comprises:
    capturing a plurality of images from the sample, wherein:
        each of the images is captured from a respective region of the sample, the respective region of the sample having one dimension of at least 100 um,
        each of the images is generated by filtering out signals of the uniformly repeating structures of the sample through a spatial light modulator (SLM) of the defect inspection apparatus, and
        each of the images includes a plurality of sub images that are grouped together.

3. The method of claim 2, wherein each of the sub images is generated under a different one of a respective illumination wavelength, a respective illumination mode, or a respective polarization through a light source of the defect inspection apparatus.

4. The method of claim 2, wherein the performing the enhancement process on the inspection image comprises:
joining the images to form the inspection image.

5. The method of claim 4, wherein the performing the enhancement process on the inspection image comprises:
performing a signal filtering process on the inspection image to filter out big features that have size more than 1.3 um based on a signal processing filter.

6. The method of claim 5, wherein the signal processing filter is a range filter.

7. The method of claim 5, wherein the performing the enhancement process on the inspection image comprises:
performing a histogram equalization process on the inspection image that receives the signal processing filter so as to enhance an image contrast of the inspection image.

8. The method of claim 7, wherein the performing the performing the enhancement process on the inspection image comprises:
performing an image flat field correction on the inspection image that receives the histogram equalization process.

9. The method of claim 8, wherein the performing the enhancement process on the inspection image comprises:
performing a binary enhancement process on the inspection image that receives the image flat field correction so as to remove small features that have a size less than 4 $um^2$.

10. The method of claim 1, wherein the performing the Hough transform on the inspection image comprises performing the Hough transform in a Hough space that has an angle range between −80 degrees and +80 degrees.

\* \* \* \* \*

UNITED STATES PATENT AND TRADEMARK OFFICE
CERTIFICATE OF CORRECTION

PATENT NO. : 11,989,876 B2
APPLICATION NO. : 18/143949
DATED : May 21, 2024
INVENTOR(S) : Lu et al.

It is certified that error appears in the above-identified patent and that said Letters Patent is hereby corrected as shown below:

On the Title Page

Column 2, Item (56), Under "Other Publication", Line 1, delete "ofthe" and insert -- of the --, therefor.

In the Claims

In Column 20, Claim 2, Line 59, delete "100 um," and insert -- 100 µm, --, therefor.

In Column 21, Claim 5, Line 11, delete "1.3 um" and insert -- 1.3 µm --, therefor.

In Column 22, Claim 8, Line 1 and 2, delete "performing the performing the" and insert -- performing the --, therefor.

In Column 22, Claim 9, Line 13, delete "4 um$^2$." and insert -- 4 µm$^2$. --, therefor.

Signed and Sealed this
Twentieth Day of August, 2024

Katherine Kelly Vidal
*Director of the United States Patent and Trademark Office*